(12) United States Patent
Tamanuki et al.

(10) Patent No.: US 7,665,906 B2
(45) Date of Patent: Feb. 23, 2010

(54) ELECTRICAL CONNECTOR FOR A MULTI FORM-FACTOR PLUGGABLE TRANSCEIVER, AND DATA COMMUNICATION SYSTEM INCLUDING THE ELECTRICAL CONNECTOR

(75) Inventors: Takemasa Tamanuki, Torrance, CA (US); Chris Keller, Torrance, CA (US)

(73) Assignee: Ibiden Co., Ltd., Ogaki-Shi (JP)

( * ) Notice: Subject to any disclaimer, the term of this patent is extended or adjusted under 35 U.S.C. 154(b) by 0 days.

(21) Appl. No.: 11/501,738

(22) Filed: Aug. 10, 2006

(65) Prior Publication Data

US 2006/0269196 A1    Nov. 30, 2006

Related U.S. Application Data

(62) Division of application No. 11/099,522, filed on Apr. 6, 2005, now Pat. No. 7,438,484.

(51) Int. Cl.
*G02B 6/36* (2006.01)
*H04B 10/00* (2006.01)

(52) U.S. Cl. .......................................... 385/92; 349/135
(58) Field of Classification Search ............. 385/88–94; 398/135–139
See application file for complete search history.

(56) References Cited

U.S. PATENT DOCUMENTS

| | | | |
|---|---|---|---|
| 3,692,966 A | 9/1972 | Lancaster | |
| 4,732,446 A | 3/1988 | Gipson et al. | |
| 4,966,430 A | 10/1990 | Wiedel | |
| 5,345,527 A | 9/1994 | Lebby et al. | |
| 5,535,296 A | 7/1996 | Uchida | |
| 5,687,267 A | 11/1997 | Uchida | |
| 5,974,064 A | 10/1999 | Uchida | |
| 6,000,955 A | 12/1999 | Zaderej | |
| 6,163,642 A | 12/2000 | Huppenthal | |
| 6,330,377 B1 | 12/2001 | Kosemura | |
| 6,382,986 B1 | 5/2002 | Kim et al. | |
| 6,457,875 B1 | 10/2002 | Kropp et al. | |
| 6,498,293 B2 | 12/2002 | Marchand et al. | |
| 6,659,343 B2 | 12/2003 | Tanaka | |

(Continued)

FOREIGN PATENT DOCUMENTS

EP    0 704 732 A1    4/1996

(Continued)

*Primary Examiner*—Kevin S Wood
(74) *Attorney, Agent, or Firm*—Oblon, Spivak, McClelland, Maier & Neustadt, P.C.

(57) ABSTRACT

An electrical connector includes an entry slot, first and second transmitter electrical pins, and first and second receiver electrical pins. The first and second transmitter electrical pins and the first and second receiver electrical pins are provided on the entry slot. The entry slot accepts a multi form-factor pluggable transceiver which has first and second optical transmitter channels and first and second optical receiver channels. The first transmitter electrical pins are electrically connected to first transmitter electrical pads of the first optical transmitter channel. The second transmitter electrical pins are electrically connected to second transmitter electrical pads of the second optical transmitter channel. The first receiver electrical pins are electrically connected to first receiver electrical pads of the first optical receiver channel. The second receiver electrical pins are electrically connected to second receiver electrical pads of the second optical receiver channel.

5 Claims, 21 Drawing Sheets

U.S. PATENT DOCUMENTS

| | | |
|---|---|---|
| 6,905,257 B2 | 6/2005 | Eichenberger et al. |
| 7,021,837 B2 | 4/2006 | Eichenberger et al. |
| 2002/0065730 A1 | 5/2002 | Nii |
| 2002/0076051 A1 | 6/2002 | Nii |
| 2003/0059167 A1 | 3/2003 | Chiu et al. |
| 2004/0029438 A1 | 2/2004 | Choy |
| 2004/0082210 A1 | 4/2004 | Wallace et al. |
| 2004/0105631 A1 | 6/2004 | Cheng et al. |
| 2004/0120658 A1 | 6/2004 | McFarland et al. |
| 2004/0264879 A1 | 12/2004 | McColloch et al. |
| 2006/0140553 A1 * | 6/2006 | Theodoras et al. ............ 385/92 |
| 2006/0171642 A1 | 8/2006 | Tamanuki et al. |

FOREIGN PATENT DOCUMENTS

| | | |
|---|---|---|
| EP | 1 143 278 A2 | 10/2001 |
| EP | 1 237 026 A2 | 9/2002 |
| EP | 1 053 575 B1 | 9/2004 |
| GB | 2 297 007 A | 7/1996 |
| JP | 08-179171 | 7/1996 |
| JP | 2001-141969 | 5/2001 |
| JP | 2002-511658 | 4/2002 |
| JP | 2002-311310 | 10/2002 |
| WO | 99/53577 | 10/1999 |
| WO | WO 00/77551 A1 | 12/2000 |

* cited by examiner

ELECTRICAL CONNECTOR FOR A MULTI FORM-FACTOR PLUGGABLE TRANSCEIVER, AND DATA COMMUNICATION SYSTEM INCLUDING THE ELECTRICAL CONNECTOR

CROSS-REFERENCE TO RELATED APPLICATIONS

This application is a divisional of U.S. patent application Ser. No. 11/099,522, filed Apr. 6, 2005. The entire contents of that application are incorporated herein by reference.

BACKGROUND OF THE INVENTION

1. Field of the Invention

The present invention relates to an electrical connector for a multi form-factor pluggable transceiver, an optical module assembly including the electrical connector and the multi form-factor pluggable transceiver, and a data communication system including the electrical connector.

2. Discussion of the Background

FIG. 1 shows a conventional electrical connector for a conventional single form-factor pluggable transceiver. Referring to FIG. 1, the conventional electrical connector 200 is manufactured by, for example, Tyco Electronics Corp under a part number 1367073-1. The conventional electrical connector 200, which is provided on a printed circuit board 240, has a single entry slot 210 with twenty electrical pins which are transmitter electrical pins and receiver electrical pins. The single entry slot 210 accepts a single-tier integrated circuit card of a mating portion of the conventional single form-factor pluggable transceiver.

FIGS. 2-5 show a conventional single form-factor pluggable transceiver which is manufactured by, for example, Sumitomo Electric Industries, Ltd. under a part number SCP6812-GL. The conventional single form-factor pluggable transceiver is also called as a conventional small form-factor pluggable transceiver by persons skilled in the art. Referring to FIGS. 2 and 3, the conventional small form-factor pluggable transceiver 250 is provided with a two-channel optical fiber body 262 between an optical fiber adapter 260 and a diode module 268. The two-channel optical fiber body 262, which is shown by partially exposed top plan views in FIGS. 2 and 3, is provided with a single optical transmitter channel Tx0 and a single optical receiver channel Rx0 which are extending through the two-channel optical fiber body 262. FIG. 4 shows a front view of the optical fiber adapter 260 which is an interface optically connectable at a front surface to a two-channel optical fiber array. The optical fiber adapter 260 is optically connected at an opposite surface to one end of the two-channel optical fiber body 262.

FIG. 5 shows a perspective view of a mating portion 270 of the conventional small form-factor pluggable transceiver 250. The mating portion 270 is provided with a single-tier integrated circuit card 280 which is electrically connected to an opposite end of the two-channel optical fiber body 262. The single-tier integrated circuit card 280 has transmitter electrical pads and receiver electrical pads. A pad layout of the single-tier integrated circuit card 280 electrically matches with pin definitions of the electrical connector 200 to electrically connect the single optical transmitter channel Tx0 and the single optical receiver channel Rx0 to the printed circuit board 240.

FIG. 6 shows a conventional cage assembly in which the conventional electrical connector 200 and the conventional small form-factor pluggable transceiver 250 are fixed. Referring to FIG. 6, the conventional cage assembly 242 includes a lower cage 244 which is fixed on the printed circuit board 240, and an upper cage 246 which covers the lower cage 244. The conventional electrical connector 200 is fixed at a closed end portion of the conventional cage assembly 242, and electrically connected to the printed circuit board 240. The conventional small form-factor pluggable transceiver 250 is inserted to the conventional cage assembly 242 from an open end portion so that the single-tier integrated circuit card 280 of the mating portion 270 is further inserted to the single entry slot 210 of the conventional electrical connector 200. An actuator 248 locks the conventional small form-factor pluggable transceiver 250 to the conventional cage assembly 242.

The conventional electrical connector, the conventional small form-factor pluggable transceiver and the conventional cage assembly are constructed according to specifications defined, for example, in Small Form-Factor Pluggable Transceiver MultiSource Agreement dated Sep. 14, 2000.

SUMMARY OF THE INVENTION

According to one aspect of the present invention, an electrical connector includes an entry slot, first and second transmitter electrical pins, and first and second receiver electrical pins. The first and second transmitter electrical pins and the first and second receiver electrical pins are provided on the entry slot. The entry slot accepts a multi form-factor pluggable transceiver. The multi form-factor pluggable transceiver has first and second optical transmitter channels and first and second optical receiver channels. The first transmitter electrical pins are electrically connected to first transmitter electrical pads of the first optical transmitter channel. The second transmitter electrical pins are electrically connected to second transmitter electrical pads of the second optical transmitter channel. The first receiver electrical pins are electrically connected to first receiver electrical pads of the first optical receiver channel. The second receiver electrical pins are electrically connected to second receiver electrical pads of the second optical receiver channel.

According to another aspect of the present invention, an optical module assembly includes a multi form-factor pluggable transceiver and an electrical connector. The multi form-factor pluggable transceiver includes a fiber array, a laser diode array and a photodiode array. The fiber array has optical fibers which are divided to a transmitter group and a receiver group. The laser diode array has laser diodes which are grouped in a transmitter group. The photodiode array has photodiodes which are divided to a monitor group and a receiver group. The laser diode array is provided between the fiber array and the photodiode array such that each end surface of the optical fibers of the transmitter group faces each laser diode of the transmitter group. Each optical fiber of the transmitter group, each laser diode of the transmitter group and each photodiode of the monitor group are optically aligned, respectively. Each optical fiber of the receiver group is optically aligned with each photodiode of the receiver group, respectively. An electrical connector includes an entry slot, first and second transmitter electrical pins, and first and second receiver electrical pins. The first and second transmitter electrical pins and the first and second receiver electrical pins are provided on the entry slot. The entry slot accepts the multi form-factor pluggable transceiver. The multi form-factor pluggable transceiver has first and second optical transmitter channels and first and second optical receiver channels. The first transmitter electrical pins are electrically connected to first transmitter electrical pads of the first optical transmitter channel. The second transmitter electrical pins are electrically connected to second transmitter electrical pads of the second optical transmitter channel. The first receiver electrical pins are electrically connected to first receiver electrical pads of the first optical receiver channel. The second receiver electrical pins are electrically connected to second receiver electrical pads of the second optical receiver channel.

According to yet another aspect of the present invention, a data communication system includes an electrical connector. The electrical connector includes an entry slot, first and second transmitter electrical pins, and first and second receiver electrical pins. The first and second transmitter electrical pins and the first and second receiver electrical pins are provided on the entry slot. The entry slot accepts a multi form-factor pluggable transceiver. The multi form-factor pluggable transceiver has first and second optical transmitter channels and first and second optical receiver channels. The first transmitter electrical pins are electrically connected to first transmitter electrical pads of the first optical transmitter channel. The second transmitter electrical pins are electrically connected to second transmitter electrical pads of the second optical transmitter channel. The first receiver electrical pins are electrically connected to first receiver electrical pads of the first optical receiver channel. The second receiver electrical pins are electrically connected to second receiver electrical pads of the second optical receiver channel.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
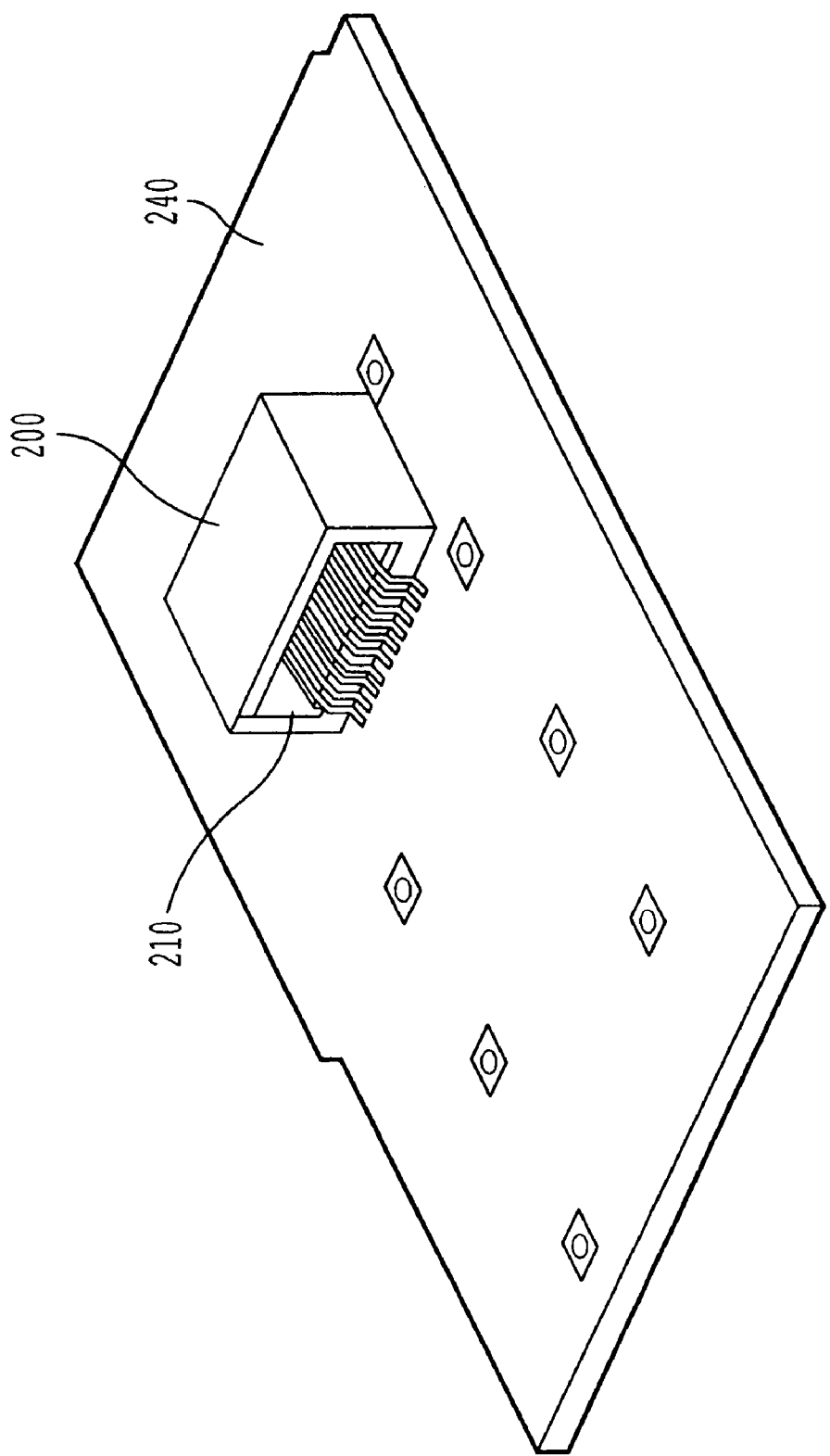
FIG. 1 is a perspective view of an electrical connector for a conventional small form-factor pluggable transceiver of background art.

The embodiments will now be described with reference to the accompanying drawings, wherein like reference numerals designate corresponding or identical elements throughout the various drawings.

Figure 7:
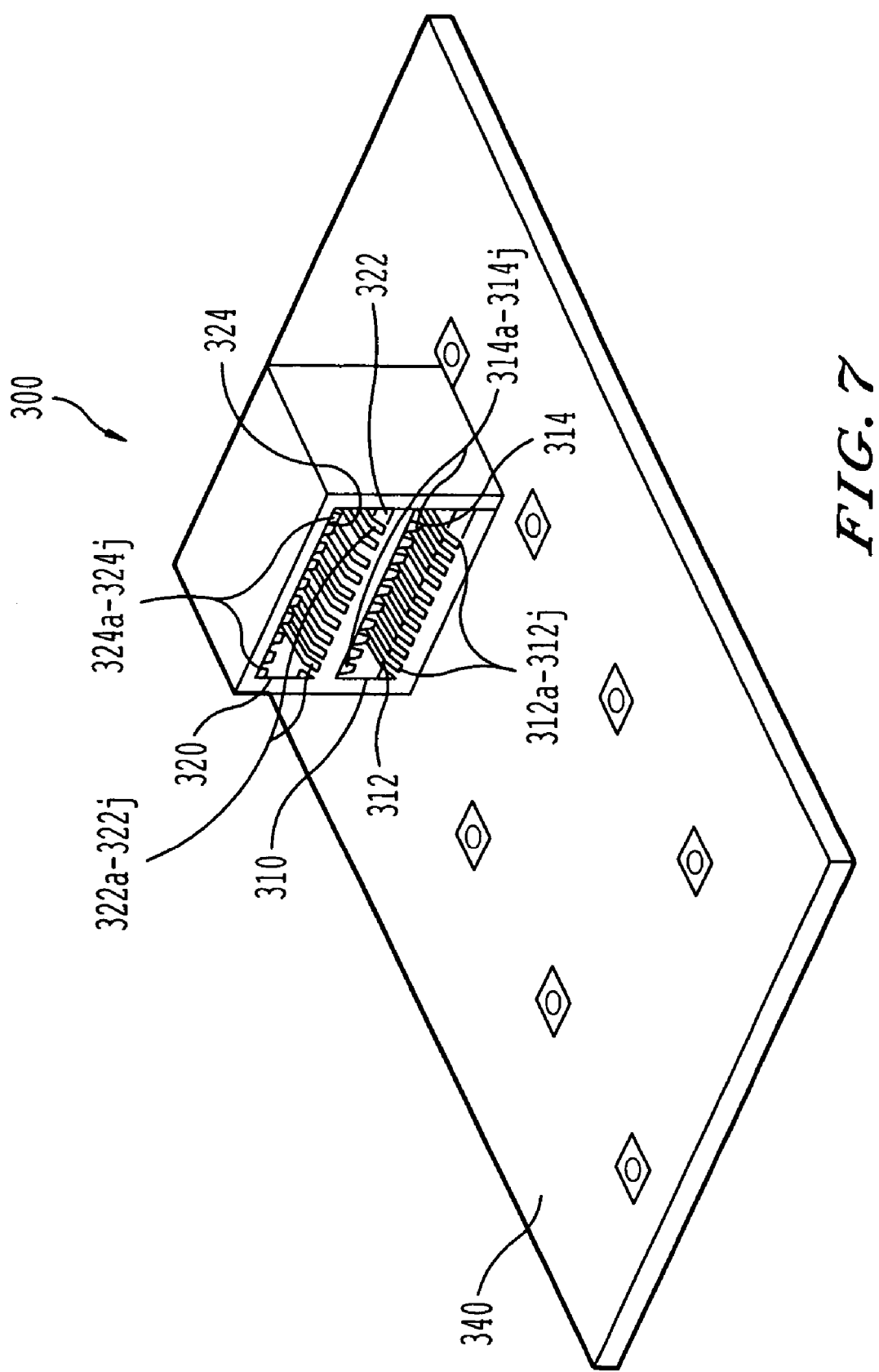
FIG. 7 is a perspective view of an electrical connector for a multi form-factor pluggable transceiver according to an embodiment of the present invention.

FIG. 7 shows an electrical connector according to an embodiment of the present invention. Referring to FIG. 7, the electrical connector 300 is provided on a printed circuit board 340. The electrical connector 300 is provided with, for example, two-tier entry slots which include a first entry slot and a second entry slot. The first entry slot has first transmitter electrical pins and first receiver electrical pins. The second entry slot has second transmitter electrical pins and second receiver electrical pins. According to this embodiment of the present invention, the first entry slot and the second entry slot are a lower entry slot 310 and an upper entry slot 320, respectively.

The lower entry slot 310 has the first transmitter electrical pins and the first receiver electrical pins which are provided on a lower wall 312 and an upper wall 314. According to this embodiment of the present invention, the first transmitter electrical pins and the first receiver electrical pins on the lower wall 312 are, for example, ten electrical pins 312a-312j. The first transmitter electrical pins and the first receiver electrical pins on the upper wall 314 are, for example, ten electrical pins 314a-314j.

The upper entry slot 320 has the second transmitter electrical pins and the second receiver electrical pins provided on a lower wall 322 and an upper wall 324. According to this embodiment of the present invention, the second transmitter electrical pins and the second receiver electrical pins on the lower wall 322 are, for example, ten electrical pins 322a-322j. The second transmitter electrical pins and the second receiver electrical pins on the upper wall 324 are, for example, ten electrical pins 324a-324j.

According to the embodiment of the present invention, the electrical connector is provided with the two-tier entry slots. However, the electrical connector may have any number of plural-tier entry slots. In addition, there may be one or more tiers between the lower entry slot 310 and the upper entry slot 320. Further, the printed circuit board 340 may be any type of circuit as long as substantially same functions are performed.

Figure 2:
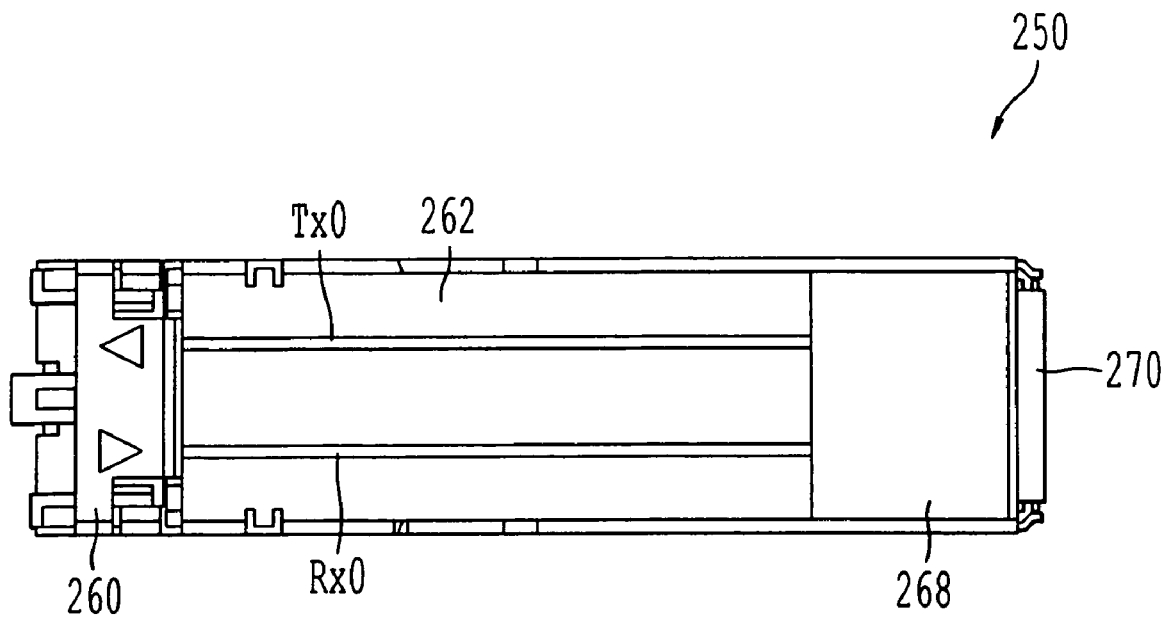
FIG. 2 is a partially exposed top plan view of the conventional small form-factor pluggable transceiver of the background art.
Figure 3:
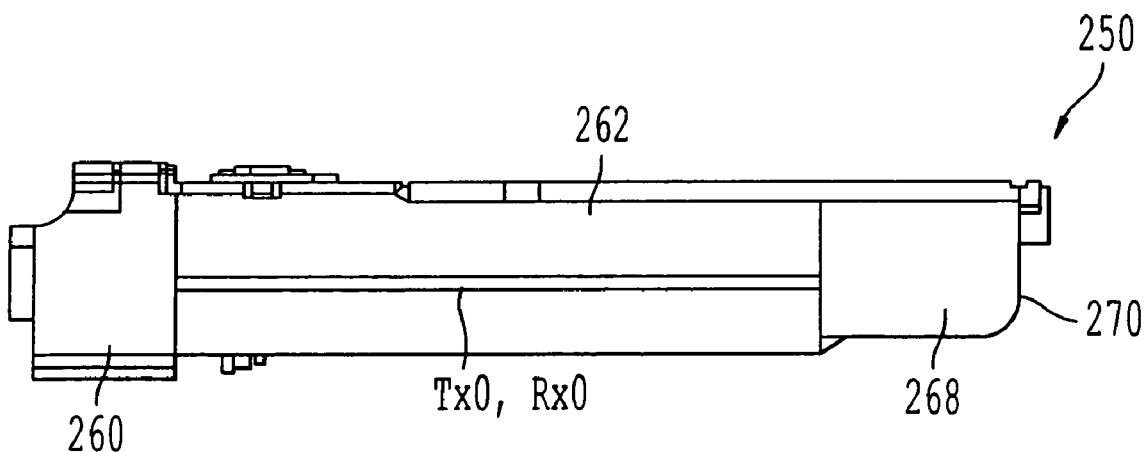
FIG. 3 is a partially exposed side view of the conventional small form-factor pluggable transceiver shown in FIG. 2.

The lower entry slot 310 is designed to accept a single-tier integrated circuit card of a mating portion of a conventional single form-factor pluggable transceiver. The conventional single form-factor pluggable transceiver is also called as a conventional small form-factor pluggable transceiver by persons skilled in the art. FIGS. 2-5 show a conventional small form-factor pluggable transceiver which is manufactured by, for example, Sumitomo Electric Industries, Ltd. under a part number SCP6812-GL. Referring to FIGS. 2 and 3, the conventional small form-factor pluggable transceiver 250 is provided with a two-channel optical fiber body 262 between an optical fiber adapter 260 and a diode module 268. The two-channel optical fiber body 262, which is shown by partially exposed top plan views in FIGS. 2 and 3, is provided with a single optical transmitter channel Tx0 and a single optical receiver channel Rx0 which are extending through the two-channel optical fiber body 262.

Figure 4:
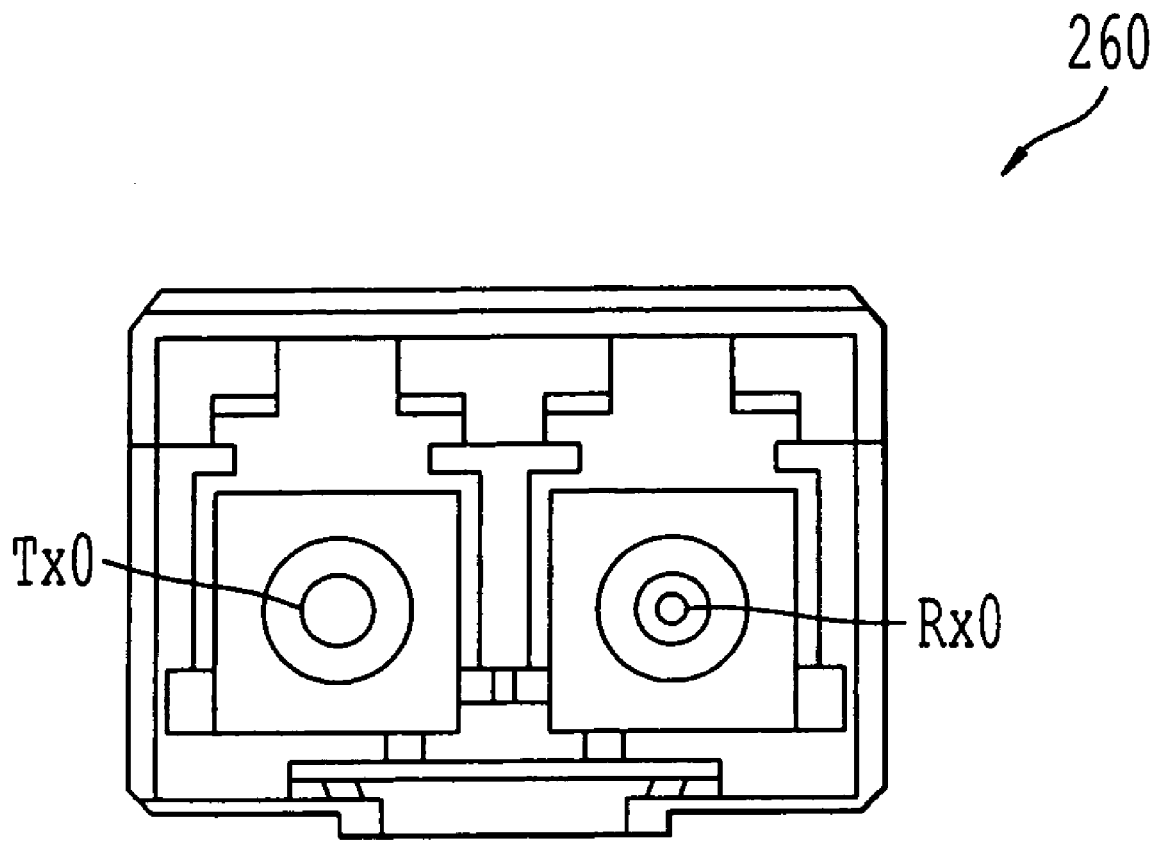
FIG. 4 is a front view of an optical fiber adapter of the conventional small form-factor pluggable transceiver shown in FIG. 2.
Figure 5:
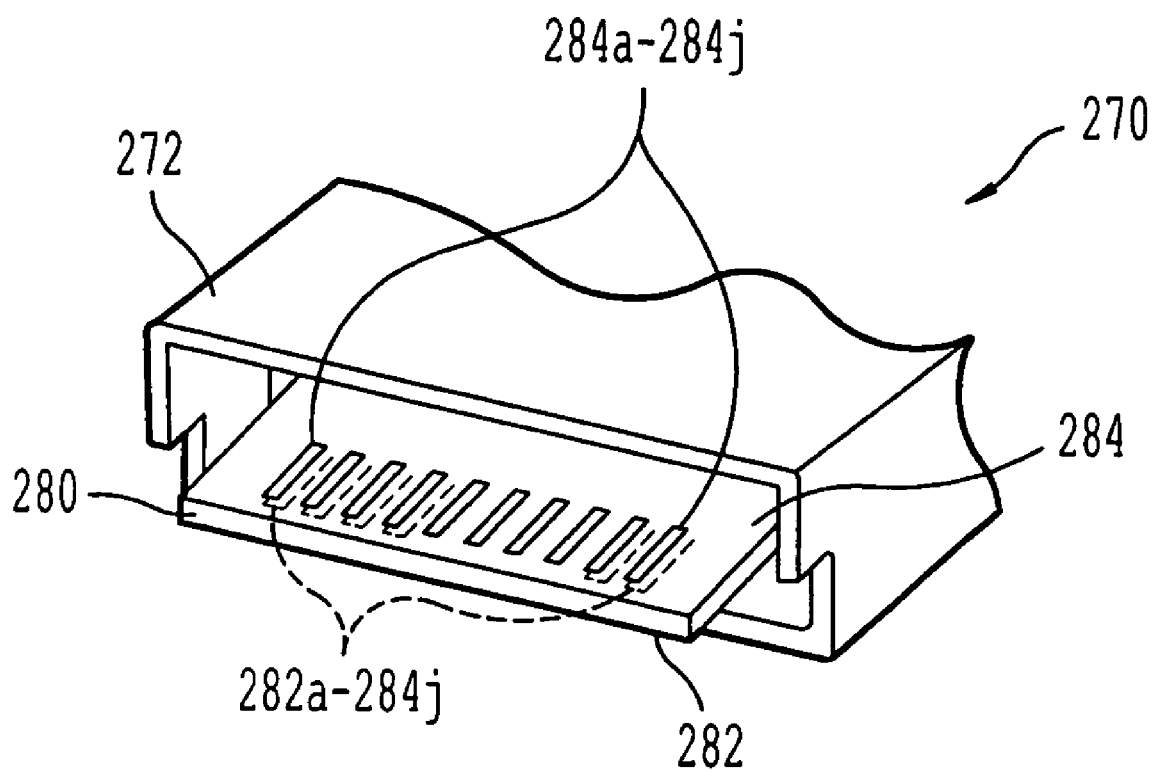
FIG. 5 is a perspective view of a mating portion of the conventional small form-factor pluggable transceiver shown in FIG. 2.

FIG. 4 shows a front view of the optical fiber adapter 260 which is an interface optically connectable at a front surface to a two-channel optical fiber array. The optical fiber adapter 260 is optically connected at an opposite surface to one end of the two-channel optical fiber body 262. FIG. 5 shows a perspective view of a mating portion 270 of the conventional small form-factor pluggable transceiver 250. The mating portion 270 is provided with a single-tier integrated circuit card 280 which is electrically connected to an opposite end of the two-channel optical fiber body 262.

As shown in FIG. 5, the single-tier integrated circuit card 280 of the mating portion 270 is provided with transmitter electrical pads and receiver electrical pads which are on a lower surface 282 and an upper surface 284. The transmitter electrical pads and the receiver electrical pads on the lower surface 282 are, for example, ten electrical pads 282a-282j. The transmitter electrical pads and the receiver electrical pads on the upper surface 284 are, for example, ten electrical pads 284a-284j. Twenty electrical pads 282a-282j and 284a-284j of the single-tier integrated circuit card 280 are assigned with functions to operate the single optical transmitter channel Tx0 and the single optical receiver channel Rx0 of the conventional small form-factor pluggable transceiver 250.

Referring back to FIG. 7, the lower entry slot 310 of the electrical connector 300 is designed such that twenty electrical pins 312a-312j and 314a-314j have pin definitions to electrically match with a pad layout of the twenty electrical pads 282a-282j and 284a-284j of the single-tier integrated circuit card 280 of the conventional small form-factor pluggable transceiver 250. Thus, the twenty electrical pins 312a-312j and 314a-314j of the lower entry slot 310 electrically connect the single optical transmitter channel Tx0 and the single optical receiver channel Rx0 of the conventional small form-factor pluggable transceiver 250 to the printed circuit board 340.

Figure 8:
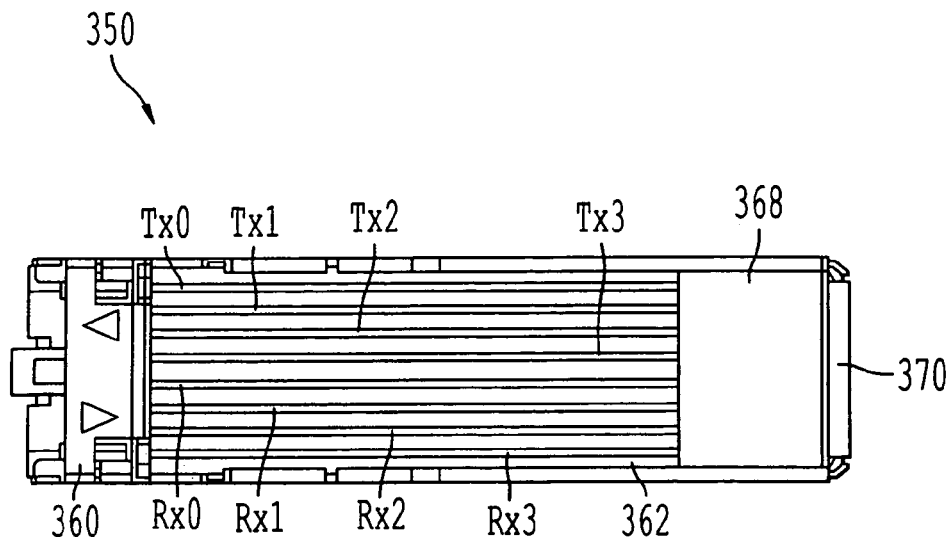
FIG. 8 is a partially exposed top plan view of the multi form-factor pluggable transceiver according to the embodiment of the present invention.
Figure 9:
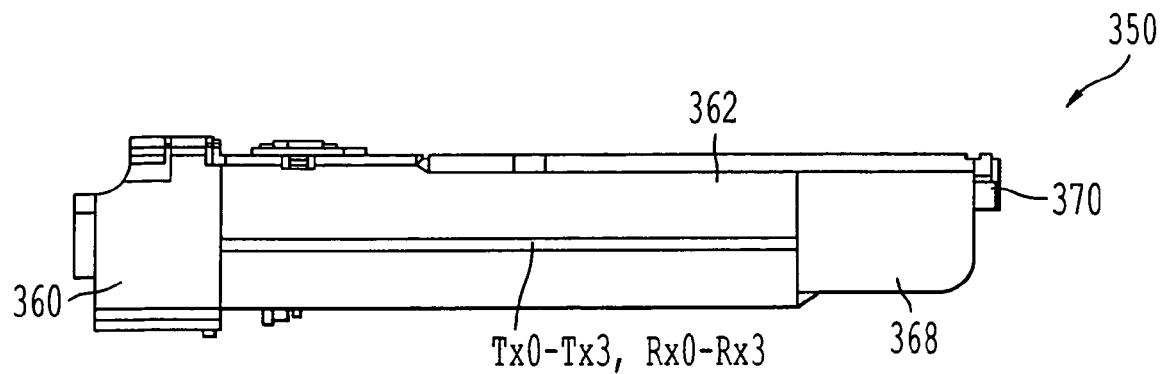
FIG. 9 is a partially exposed side view of the multi form-factor pluggable transceiver shown in FIG. 8.
Figure 10:
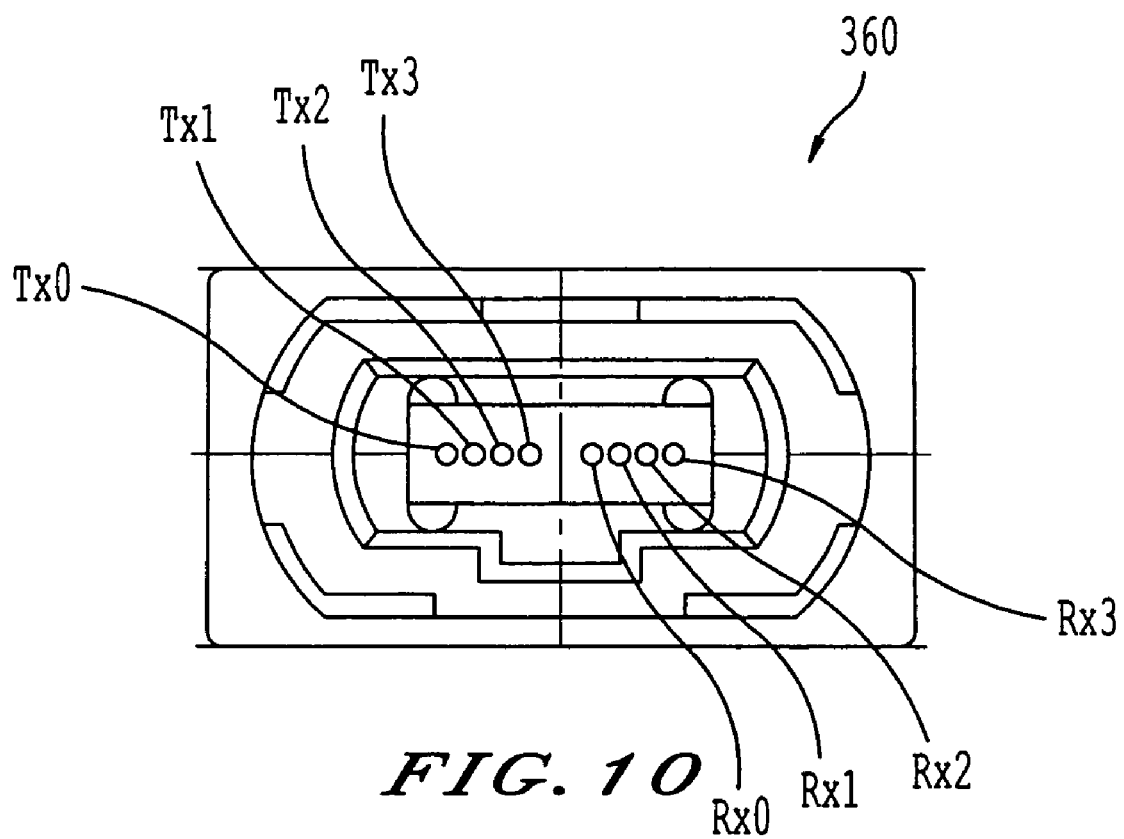
FIG. 10 is a front view of an optical fiber adapter of the multi form-factor pluggable transceiver shown in FIG. 8.
Figure 11:
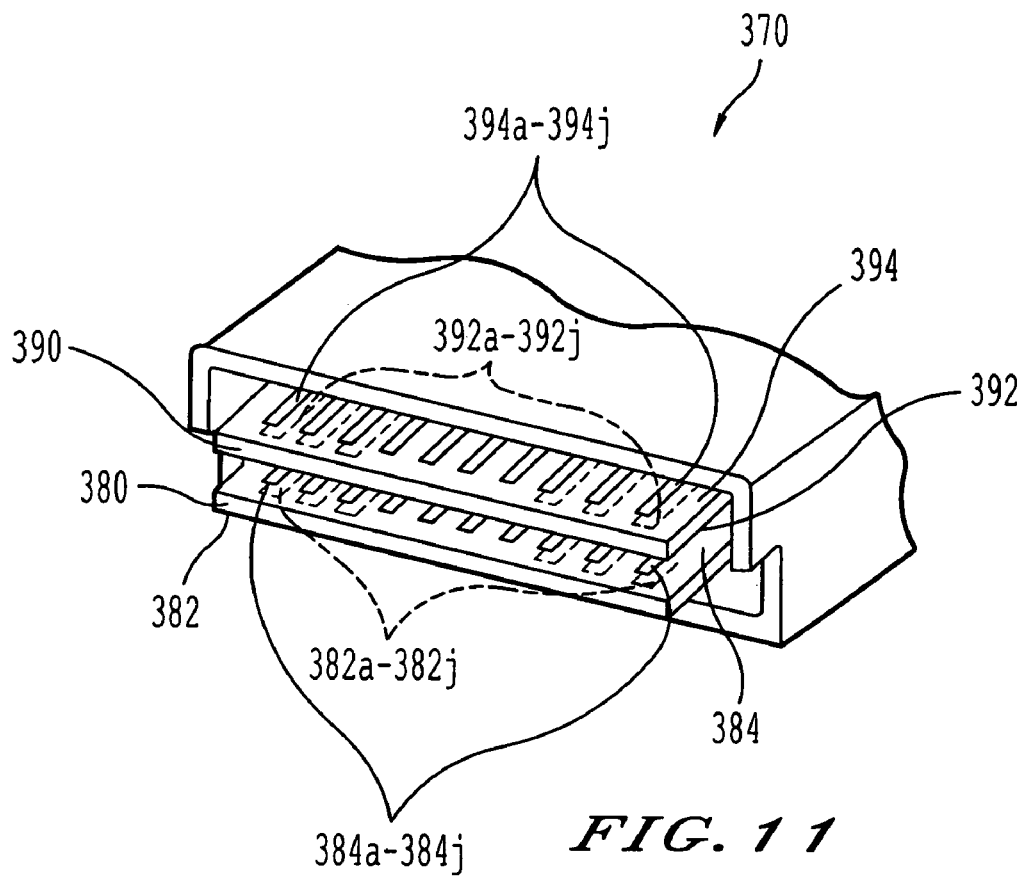
FIG. 11 is a perspective view of a mating portion of the multi form-factor pluggable transceiver shown in FIG. 8.

As an alternative to the single-tier integrated circuit card 280 of the conventional small form-factor pluggable transceiver 250, the lower entry slot 310 is also designed to accept a lower integrated circuit card of a mating portion of a multi form-factor pluggable transceiver according to the embodiment of the present invention. Referring to FIGS. 8 and 9, a multi form-factor pluggable transceiver 350 is provided with an optical fiber adapter 360 at one end and the mating portion 370 at an opposite end. The multi form-factor pluggable transceiver 350 has, for example, eight optical channels which are, for example, first to fourth optical transmitter channels Tx0-Tx3 and first to fourth optical receiver channels Rx0-Rx3 as shown by partially exposed top plan views in FIGS. 8 and 9. The eight optical channels are laid out inside an eight-channel optical fiber body 362 of the multi form-factor pluggable transceiver 350. FIG. 10 shows a front view of the optical fiber adapter 360 which is an interface to connect, for example, a multi-path push on connector with eight optical channels to the multi form-factor pluggable transceiver 350. FIG. 11 shows a perspective view of the mating portion 370 which is provided with, for example, two-tier integrated circuit cards which are a lower integrated circuit card 380 and an upper integrated circuit card 390. One end of each of the eight optical channels is optically connected to the optical fiber adapter 360. An opposite end of each of the eight optical channels is electrically connected to either the lower integrated circuit card 380 or the upper integrated circuit card 390, through a diode module 368 shown in FIGS. 8 and 9. The diode module 368 is provided between the eight-channel optical fiber body 362 and the mating portion 370, and may include, for example, any one of or combination of a fiber array, a laser diode array, a photodiode array and electrical circuits.

As shown in FIG. 11, the lower integrated circuit card 380 of the mating portion 370 has first transmitter electrical pads and first receiver electrical pads which are provided on a lower surface 382 and an upper surface 384. According to this embodiment of the present invention, the first transmitter electrical pads and the first receiver electrical pads on the lower surface 382 are, for example, ten electrical pads 382a-382j. The first transmitter electrical pads and the first receiver electrical pads on the upper surface 384 are, for example, ten electrical pads 384a-384j. A pad layout of twenty electrical pads 382a-382j and 384a-384j of the lower integrated circuit card 380 is arranged in a substantially same manner as the pad layout of the twenty electrical pads 282a-282j and 284a-284j of the single-tier integrated circuit card 280 of the conventional small form-factor pluggable transceiver 250. Thus, similarly to the twenty electrical pads 282a-282j and 284a-284j of the conventional small form-factor pluggable transceiver 250, the twenty electrical pads 382a-382j and 384a-384j of the lower integrated circuit card 380 of the multi form-factor pluggable transceiver 350 are assigned with functions to operate a first optical transmitter channel Tx0 and a first optical receiver channel Rx0 of the multi form-factor pluggable transceiver 350.

Accordingly, when the lower integrated circuit card 380 of the multi form-factor pluggable transceiver 350 is inserted to the lower entry slot 310 of the electrical connector 300, instead of the single-tier integrated circuit card 280 of the conventional small form-factor pluggable transceiver 250, the first optical transmitter channel Tx0 and the first optical receiver channel Rx0 of the multi form-factor pluggable transceiver 350 are electrically connected to the printed circuit board 340. Therefore, the lower entry slot 310 of the electrical connector 300 is compatible with both the single-tier integrated circuit card 280 of the conventional small form-factor pluggable transceiver 250 shown in FIG. 5 and the lower integrated circuit card 380 of the multi form-factor pluggable transceiver 350 shown in FIG. 11.

The upper entry slot 320 of the electrical connector 300 shown in FIG. 7 is designed to accept the upper integrated circuit card 390 of the mating portion 370 of the multi form-factor pluggable transceiver 350. Referring to FIG. 11, the upper integrated circuit card 390 has second transmitter electrical pads and second receiver electrical pads which are provided on a lower surface 392 and an upper surface 394. According to this embodiment of the present invention, the second transmitter electrical pads and the second receiver electrical pads on the lower surface 392 are, for example, ten electrical pads 392a-392j. The second transmitter electrical pads and the second receiver electrical pads on the upper surface 394 are, for example, ten electrical pads 394a-394j. Twenty electrical pads 392a-392j and 394a-394j of the upper integrated circuit card 390 are assigned with functions to operate second to fourth optical transmitter channels Tx1-Tx3 and second to fourth optical receiver channels Rx1-Rx3 of the multi form-factor pluggable transceiver 350.

According to the embodiment of the present invention, electrical pins of the electrical connector 300 and electrical pads of the multi form-factor pluggable transceiver 350 may be electrical pads and electrical pins, respectively, and may have any shapes or materials as long as substantially same functions are performed. In addition, electrical pads of the two-tier integrated circuit cards of the mating portion 370 may be provided on other type or types of electrical circuits or any other elements or materials as long as substantially same functions are performed.

In the multi form-factor pluggable transceiver 350 according to the embodiment of the present invention, some of functions to operate the first optical transmitter channel Tx0 and the first optical receiver channel Rx0 are substantially same as those to operate the second to fourth optical transmitter channels Tx1-Tx3 and the second to fourth optical receiver channels Rx1-Rx3. Thus, referring to FIG. 11, some of the twenty electrical pads 382a-382j and 384a-384j of the lower integrated circuit card defined with the some of the functions may be shared by the second to fourth optical transmitter channels Tx1-Tx3 and the second to fourth optical receiver channels Rx1-Rx3. Therefore, unlike the first optical transmitter channel Tx0 and the first optical receiver channel Rx0, each respective pair of the second to fourth optical transmitter channels Tx1-Tx3 and the second to fourth optical receiver channels Rx1-Rx3 does not require twenty electrical pads to be operated.

Referring to FIGS. 7 and 11, the upper entry slot 320 of the electrical connector 300 is designed such that twenty electrical pins 322a-322j and 324a-324j have pin definitions to electrically match with a pad layout of the twenty electrical pads 392a-392j and 394a-394j of the upper integrated circuit card 390 of the multi form-factor pluggable transceiver 350. Thus, the twenty electrical pins 322a-322j and 324a-324j of the upper entry slot 320 electrically connect the second to fourth optical transmitter channels Tx1-Tx3 and the second to fourth optical receiver channels Rx1-Rx3 of the multi form-factor pluggable transceiver 350 to the printed circuit board 340.

According to the embodiment of the present invention, the mating portion 370 of the multi form-factor pluggable transceiver 350 is provided with the two-tier integrated circuit cards as shown in FIG. 11. However, the mating portion 370 may have any number of plural-tier integrated circuit cards or cards with other functions. The mating portion 370 may have one or more tiers of cards between the lower integrated circuit card 380 and the upper integrated circuit card 390. There may be one or more tiers of integrated circuit cards or cards with other functions below the lower integrated circuit card 380 or above the upper integrated circuit card 390 as long as the lower integrated circuit card 380 and the upper integrated circuit card 390 are positioned to be insertable to the lower entry slot 310 and the upper entry slot 320, respectively, of the electrical connector 300 shown in FIG. 7.

In addition, according to the embodiment of the present invention shown in FIGS. 7 and 11, the pad layout of the lower integrated circuit card 380 of the multi form-factor pluggable transceiver 350 and the pin definitions of the lower entry slot 310 of the electrical connector 300 may be arranged to operate the second to fourth optical transmitter channels Tx1-Tx3 and the second to fourth optical receiver channels Rx1-Rx3 of the multi form-factor pluggable transceiver 350. Accordingly, the pad layout of the upper integrated circuit card 390 and the pin definitions of the upper entry slot 320 may be arranged to operate the first optical transmitter channel Tx0 and the first optical receiver channel Rx0 of the multi form-factor pluggable transceiver 350. Consequently, the single-tier integrated circuit card 280 of the conventional small form-factor pluggable transceiver 250 shown in FIG. 5 may be constructed to be insertable to the upper entry slot 320 of the electrical connector 300 to operate the single optical transmitter channel Tx0 and the single optical receiver channel Rx0 of the conventional small form-factor pluggable transceiver 250.

Figure 6:
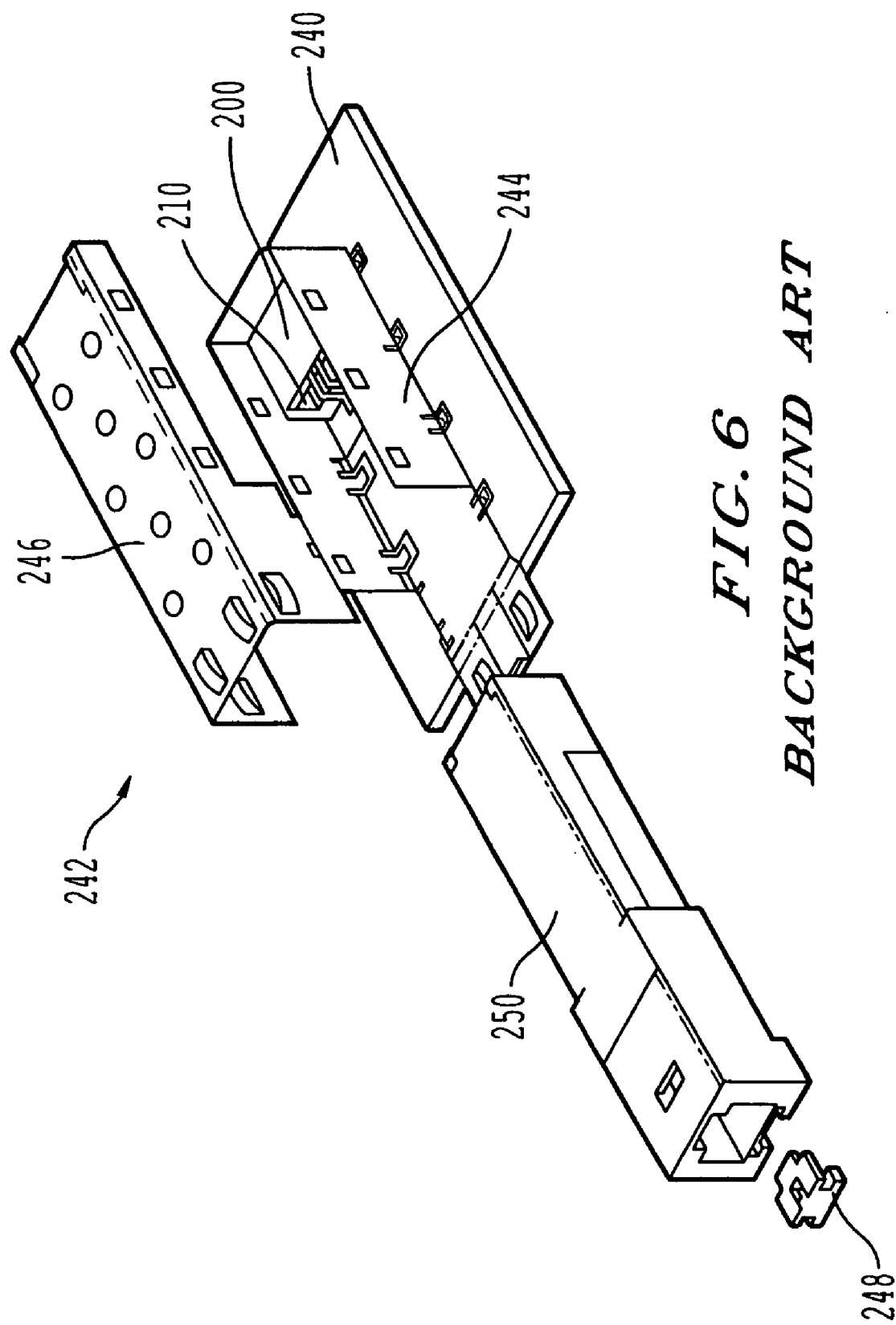
FIG. 6 is a perspective view of a conventional cage assembly of the background art.

According to the embodiment of the present invention, the electrical connector 300 and the multi form-factor pluggable transceiver 350 are designed to be fixed in a conventional cage assembly which has a substantially same specification as a conventional cage assembly 242 for the conventional small form-factor pluggable transceiver 250 shown in FIG. 6. As a result, without increasing a size of the conventional cage assembly for the conventional small form-factor pluggable transceiver, the electrical connector and the multiform-factor pluggable transceiver according to the embodiment of the present invention can increase, within limited space, a number of optical transmitter channels and optical receiver channels.

Further, the electrical connector 300 according to the embodiment of the present invention is designed to be compatible with both the conventional small form-factor pluggable transceiver 250 and the multi form-factor pluggable transceiver 350. As a result, a user can chose to install either the conventional small form-factor pluggable transceiver or the multi form-factor pluggable transceiver, depending on necessity, even after fixing the electrical connector according to the present invention to the conventional cage assembly.

According to this embodiment of the present invention, when a single-tier integrated circuit card of a mating portion of a conventional small form-factor pluggable transceiver is to be inserted to the lower entry slot 310 of the electrical connector 300 shown in FIG. 7, an upper half of an end frame of the mating portion may obstruct an insertion to the lower entry slot 310. If such a case occurs, a shape of the upper half of the end frame may be modified not to obstruct the insertion.

Figure 12:
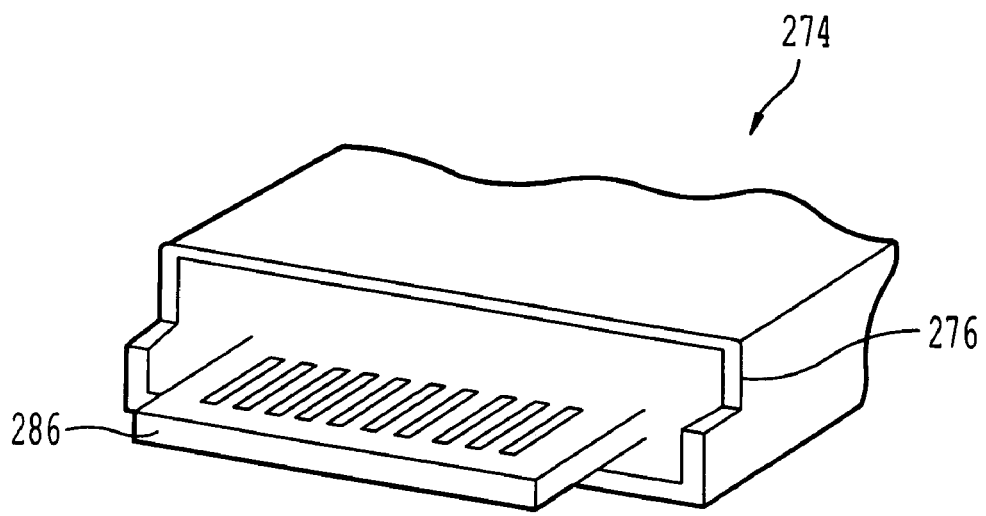
FIG. 12 is a perspective view of a mating portion of a conventional small form-factor pluggable transceiver with a modification according to an embodiment of the present invention.

FIG. 12 shows a perspective view of a mating portion of a conventional small form-factor pluggable transceiver, according to an embodiment of the present invention, with a modification to make a single-tier integrated circuit card of the mating portion insertable to the lower entry slot 310 of the electrical connector 300. Referring to FIGS. 7 and 12, an upper half of an end frame 276 of the mating portion 274 is cut off thereby making the single-tier integrated circuit 286 insertable to the lower entry slot 310. As a result, the electrical connector according to this embodiment of the present invention can be compatible with both the conventional small form-factor pluggable transceiver with this modification and the multi form-factor pluggable transceiver.

In addition, when the upper half of the end frame of the mating portion of the conventional small form-factor pluggable transceiver obstructs the insertion of the single-tier integrated circuit card of the conventional small form-factor pluggable to the lower entry slot 310 of the electrical connector 300 shown in FIG. 7, the electrical connector 300 may be modified to make the single-tier integrated circuit card insertable without modifying the shape of the upper half of the end frame of the mating portion.

Figure 13:
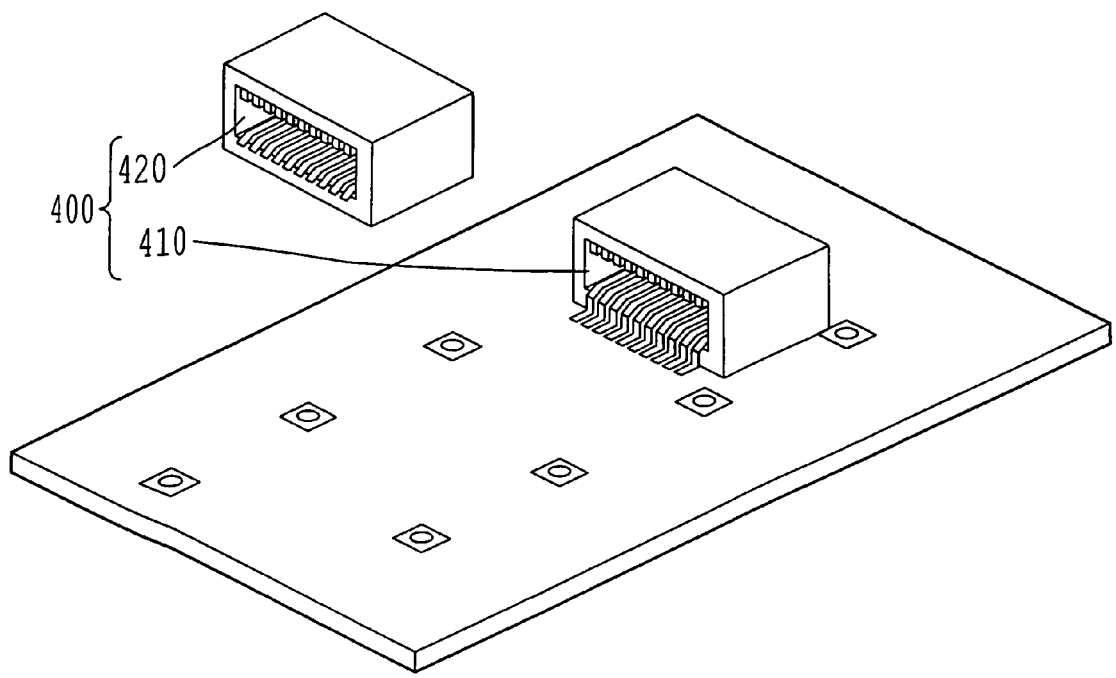
FIG. 13 is a perspective view of an electrical connector for the multi form-factor pluggable transceiver according to an embodiment of the present invention.

FIG. 13 shows an electrical connector, according to an embodiment of the present invention, with a modification to make an upper entry slot detachable from a lower entry slot. Referring to FIGS. 11 and 13, the electrical connector 400 is provided with first transmitter electrical pins and first receiver electrical pins on the lower entry slot 410 and on the upper entry slot 420. The first transmitter electrical pins and the first receiver electrical pins on the lower entry slot 410 are, for example, twenty electrical pins. The first transmitter electrical pins and the first receiver electrical pins on the upper entry slot 420 are, for example, twenty electrical pins. The lower entry slot 410 has pin definitions to electrically match with a pad layout of the single-tier integrated circuit card of the conventional small form-factor pluggable transceiver. Because the pad layout of the lower integrated circuit card 380 is arranged to be substantially same as the pad layout of the single-tier integrated circuit card of the conventional small form-factor pluggable transceiver, the pin definitions of the lower entry slot 410 also electrically match with the pad layout of the lower integrated circuit card 380. The upper entry slot 420 has pin definitions to electrically match with the pad layout of the upper integrated circuit card 390 of the multi form-factor pluggable transceiver 350. The upper entry slot 420 is arranged to be detachable from the lower entry slot 410.

Accordingly, when the single-tier integrated circuit card of the conventional small form-factor pluggable transceiver is to be inserted to the lower entry slot 410 of the electrical connector 400, the upper entry slot 420 is to be detached from the lower entry slot 410 thereby making the single-tier integrated circuit card insertable to the lower entry slot 410. Alternatively, when the two-tier integrated circuit cards of the multi form-factor pluggable transceiver 350 is to be inserted to the lower entry slot 410 and the upper entry slot 420, the upper entry slot 420 is to be remained attached to the lower entry slot 410. As a result, the electrical connector with the modification according to this embodiment of the present invention can be compatible with both the multi form-factor pluggable transceiver and the conventional small form-factor pluggable transceiver.

Further, when the upper half of the end frame of the mating portion of the conventional small form-factor pluggable obstructs the insertion of the single-tier integrated circuit card of the conventional small form-factor pluggable transceiver to the lower entry slot 310 of the electrical connector 300 shown in FIG. 7, the electrical connector 300 and the mating portion 370 of the multi form-factor pluggable transceiver 350 may be modified to make the electrical connector 300 compatible with the mating portion of the conventional small form-factor pluggable transceiver without modifying the mating portion of the conventional small form-factor pluggable transceiver.

Figure 14:
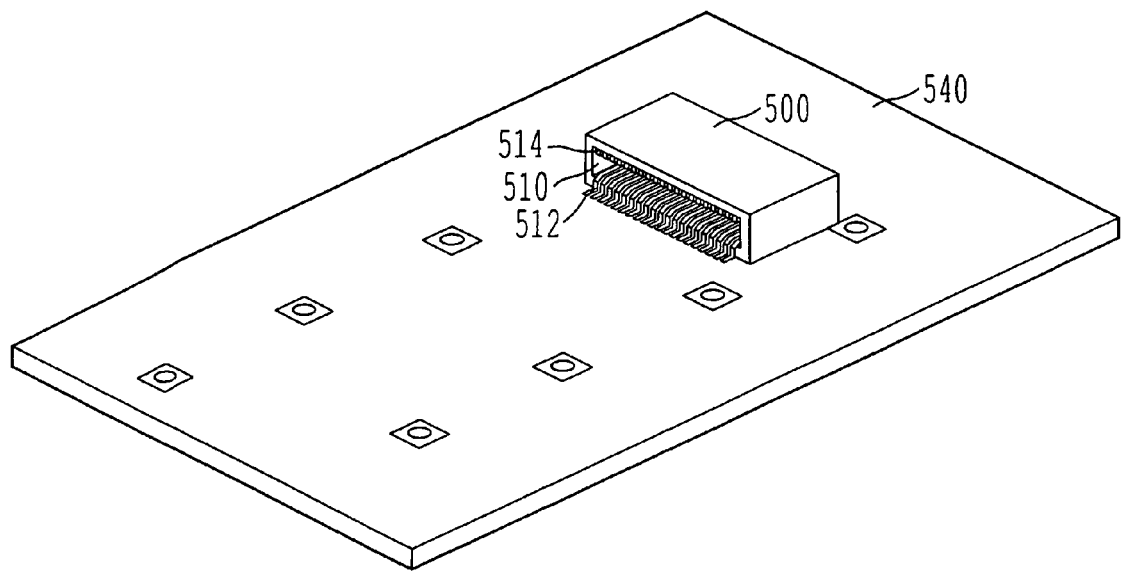
FIG. 14 is a perspective view of an electrical connector for a multi form-factor pluggable transceiver according to an embodiment of the present invention.

FIG. 14 shows an electrical connector, according to an embodiment of the present invention, with a single entry slot which has transmitter electrical pins and receiver electrical pins at substantially a half of a pitch of electrical pins of the lower entry slot 310 of the electrical connector 300 shown in FIG. 7. Referring to FIG. 14, the electrical connector 500 is provided with the single entry slot 510. The single entry slot 510 has first and second transmitter electrical pins and first and second receiver electrical pins. The first and second transmitter electrical pins and the first and second receiver electrical pins are, for example, forty electrical pins, twenty of which are on a lower wall 512 and twenty of which are on an upper wall 514. The forty electrical pins are arranged at substantially a half of the pitch of the twenty electrical pins of the lower entry slot 310 of the electrical connector 300, and consequently, at substantially a half of the pitch of the twenty electrical pins of the single entry slot 210 of the conventional electrical connector 200. Thus, within substantially sane space, the single entry slot 510 has two times more electrical pins than those of the lower entry slot 310 of the electrical connector 300 and the single entry slot 210 of the conventional electrical connector 200.

The single entry slot 510 is designed such that the single-tier integrated circuit card 280 of the conventional small form-factor pluggable transceiver 250 shown in FIG. 5 is insertable. The forty electrical pins of the single entry slot 510 are grouped in a first group of electrical pins and a second group of electrical pins. The first group of electrical pins includes, for example, every other electrical pin of the forty electrical pins which has a pin definition which electrically matches with a pad definition of each corresponding one of the twenty electrical pads of the single-tier integrated circuit card 280 of the conventional small form-factor pluggable transceiver 250. Thus, the electrical connector 500 is made to be compatible with the conventional small form-factor pluggable transceiver 250 to operate the single optical transmitter channel Tx0 and the single optical receiver channel Rx0.

Figure 15:
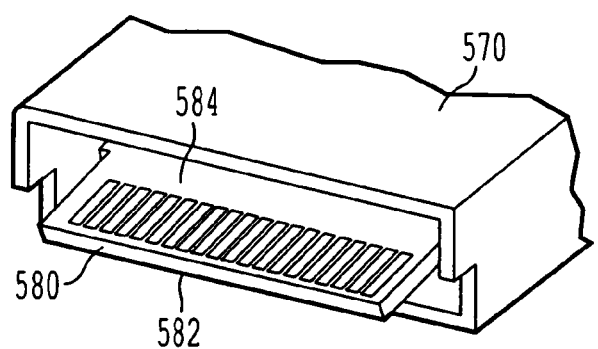
FIG. 15 is a perspective view of a mating portion of the multi form-factor pluggable transceiver according to the embodiment of the present invention.

Further, referring to FIG. 15, a multi form-factor pluggable transceiver with first to fourth optical transmitter channels Tx0-Tx3 and first to fourth optical receiver channels Rx0-Rx3 is provided with a mating portion 570. The mating portion 570 has a single-tier integrated circuit card 580 provided with, for example, forty electrical pads, twenty of which on a lower surface 582 and twenty of which on an upper surface 584. The forty electrical pads are grouped in a first group of electrical pads and a second group of electrical pads.

The first group of electrical pads includes, for example, every other electrical pad of the forty electrical pads which is assigned with one of functions to operate the first optical transmitter channel Tx0 and the first optical receiver channel Rx0, positioned at a substantially same location as a location of each corresponding one of the twenty electrical pads of the single-tier integrated circuit card 280 of the conventional small form-factor pluggable transceiver 250 shown in FIG. 5, and assigned to have a substantially same pad definition as that of each corresponding pad of the single-tier integrated circuit card 280. Thus, as an alternative to the single-tier integrated circuit card 280 of the conventional small form-factor pluggable transceiver 250, when the single-tier integrated circuit card 580 is inserted to the single entry slot 510, the first optical transmitter channel Tx0 and the first optical receiver channel Rx0 of the multi form-factor pluggable transceiver are electrically connected to a printed circuit board 540.

Furthermore, the second group of electrical pads includes, for example, another every other electrical pad of the forty electrical pads of the single-tier integrated circuit card 580 shown in FIG. 15 which is assigned with one of functions to operate the second to fourth optical transmitter channels Tx1-Tx3 and the second to fourth optical receiver channels Rx1-Rx3. Accordingly, the single entry slot 510 shown in FIG. 14 is also arranged such that the second group of electrical pins includes another every other electrical pin of the forty electrical pins which has a pin definition which electrically matches with a pad definition of the anther every other electrical pad of the single-tier integrated circuit card 580. Thus, when the single-tier integrated circuit card 580 is inserted to the single entry slot 510, the second to fourth optical transmitter channel Tx1-Tx3 and the second to fourth optical receiver channel Rx1-Rx3 of the multi form-factor pluggable transceiver are electrically connected to the printed circuit board 540.

Therefore, the forty electrical pins of the single entry slot 510 of the electrical connector 500 electrically connect the first to fourth optical transmitter channels Tx0-Tx3 and the first to fourth optical receiver channels Rx0-Rx3 of the multi form-factor pluggable transceiver to the printed circuit board 540. Accordingly, the electrical connector 500 is made to be also compatible with the multi form-factor pluggable transceiver. As a result, the electrical connector according to this embodiment of the present invention can be compatible with both the conventional small form-factor pluggable transceiver and the multi form-factor pluggable transceiver according to this embodiment of the present invention.

Figure 16:
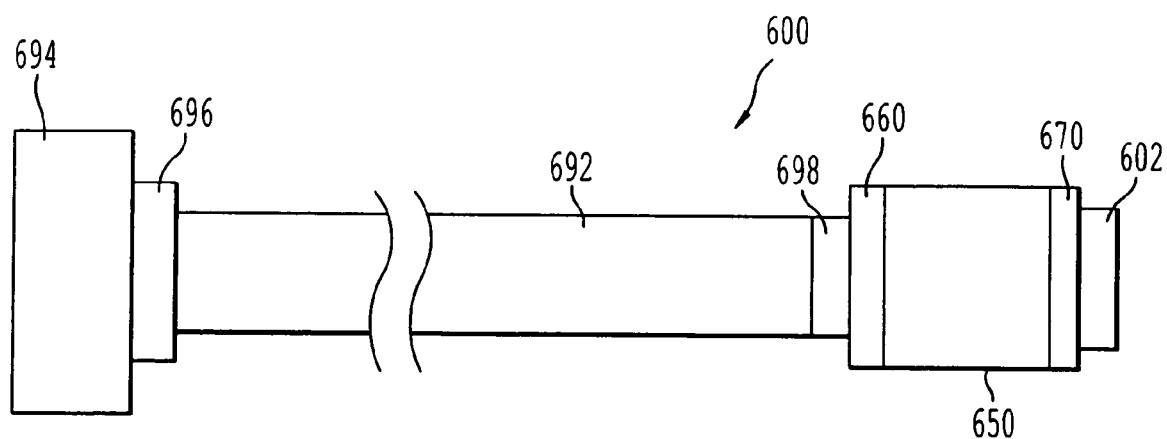
FIG. 16 is showing a data communication system according to an embodiment of the present invention.

FIG. 16 shows a data communication system according to an embodiment of the present invention. Referring to FIG. 16, the data communication system 600 includes at least one electrical connector 602 according to an embodiment of the present invention, which is, for example, the electrical connector 300 shown in FIG. 7. The data communication system 600 may include a multi form-factor pluggable transceiver 650 according to an embodiment of the present invention, which is for example, the multi form-factor pluggable transceiver 350 shown in FIGS. 8-11. As shown in FIG. 16, the optical fiber adapter 660 of the multi form-factor pluggable transceiver 650 is connected to fiber ends 698 of a communication fiber array 692. Another fiber ends 696 of the communication fiber array 692 is connected to a data communication module 694.

The data communication system 600 according to the embodiment of the present invention may include any of other electrical connectors, for example, shown in FIGS. 1, 13 and 14. The data communication system 600 may include another embodiment of multi form-factor pluggable transceivers one of which is, for example, the multi form-factor pluggable transceiver with the mating portion shown in FIG. 15. The data communication system 600 may include any one of conventional small form-factor pluggable transceivers, one of which is, for example, the conventional small form-factor pluggable transceiver 250 shown in FIGS. 2-5.

The data communication system 600 may be, for example, an intermediate optical fiber communication system or a part of the intermediate optical fiber communication system. A service provider of the intermediate optical fiber communication system, which has many individual subscribers, may be required to carry, for example, one thousand of multi form-factor pluggable transceivers at a node of a base station of the service provider. According to this embodiment of the present invention, because the electrical connector 602 and the multi form-factor pluggable transceiver 650 can increase, within limited space, a number of optical transmitter channels and optical receiver channels, a size of the data communication system 600 can be decreased. The data communication system 600 can also be at least a part of, for example, a satellite communication system, a telecommunication system, a visual image communication system or a computer data communication system.

Figure 17:
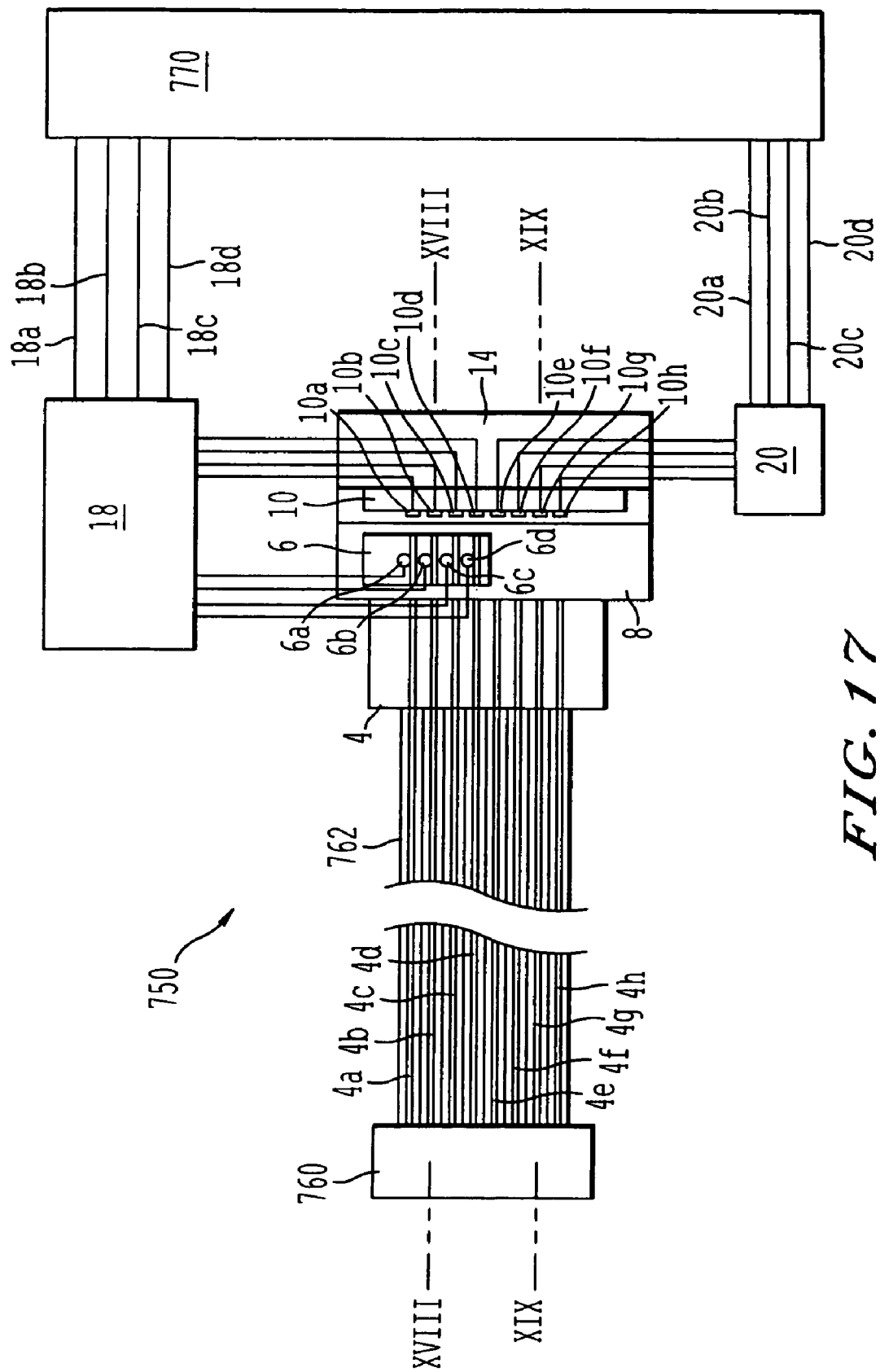
FIG. 17 is a partially exposed top plan view of a multi form-factor pluggable transceiver according to an embodiment of the present invention.
Figure 18:
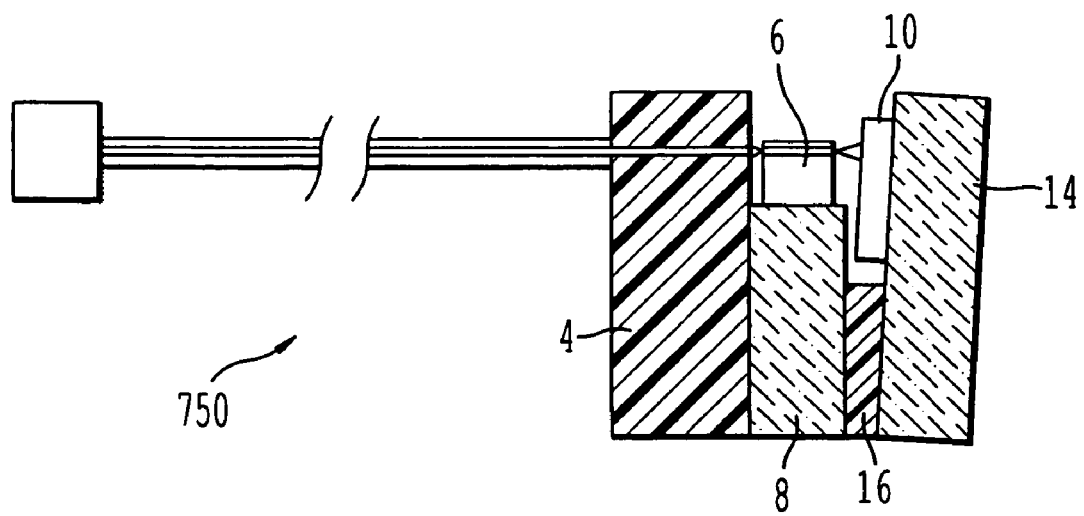
FIG. 18 is a cross sectional view of the multi form-factor pluggable transceiver cut along the line XVIII-XVIII of FIG. 17.
Figure 19:
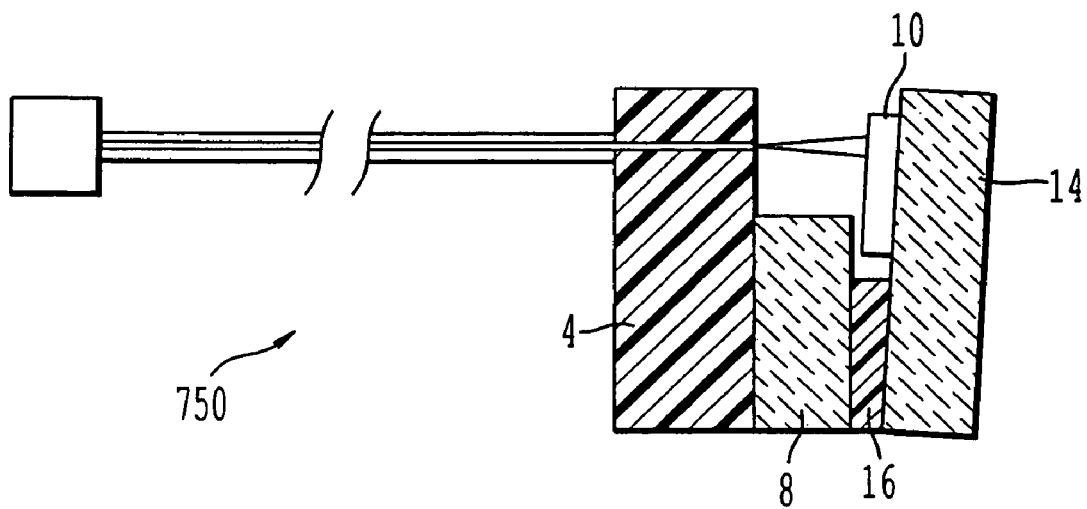
FIG. 19 is a cross sectional view of the multi form-factor pluggable transceiver cut along the line XIX-XIX of FIG. 17.

FIGS. 17-19 show a multi form-factor pluggable transceiver according to an embodiment of the present invention, which is, for example, the multi form-factor pluggable transceiver 350 shown in FIGS. 8-11. Referring to FIGS. 17-19, the multi form-factor pluggable transceiver 750 includes, a multi-channel, for example, 8-channel fiber array 4, a multi-channel, for example, 4-channel laser diode array 6, a laser diode submount 8, a multi-channel, for example, 8-channel photodiode array 10, and a photodiode submount 14.

The laser diode array 6 is bonded on the laser diode submount 8. The photodiode array 10 is bonded to the photodiode submount 14. The fiber array 4 and the photodiode submount 14 are connected to sandwich the laser diode submount 8. A spacer 16 is provided between the photodiode submount 14 and the laser diode submount 8 to tilt the photodiode array, with a predetermined angle, away from the fiber array 4 to reduce unwanted back reflection, caused by the photodiode array 10, into optical fibers of the fiber array. The spacer 16 has a thickness of, for example, about 200 μm and is made of, for example, a resin material. The phrase "about 200 μm" includes reasonable measuring margins of error accepted by persons skilled in the art. This use of "about" is applicable throughout this specification.

The fiber array 4 includes eight optical fibers 4a-4h extending through the fiber array 4. The fiber array 4 is divided to a transmitter group which includes first to fourth optical fibers 4a-4d, and a receiver group which includes fifth to eighth optical fibers 4e-4h. The laser diode array 6 includes first to fourth laser diodes 6a-6d which are grouped together as a transmitter group. The photodiode array 10 includes eight photodiodes which are divided to a monitor group including first to fourth photodiodes 10a-10d and a receiver group including fifth to eighth photodiodes 10e-10h.

The fiber array 4, the laser diode array 6, and the photodiode array 10 are arranged such that the first to fourth optical fibers 4a-4d of the transmitter group, the first to fourth laser diodes 6a-6d of the transmitter group and the first to fourth photodiodes 10a-10d of the monitor group are optically aligned, respectively, and the fifth to eighth optical fibers 4e-4h of the receiver group and the fifth to eighth photodiodes 10e-10h of the receiver group are optically aligned, respectively.

The eight optical fibers 4a-4h are included in an eight-channel optical fiber body 762 which corresponds to, for example, the eight-channel optical fiber body 362 in FIGS. 8 and 9. The eight-optical fiber body 762 is optically connected to an optical fiber adapter 760 at one end, and electrically connected at an opposite end to the mating portion 770 through a diode module which includes the fiber array 4, the laser diode array 6, the photodiode array 10, a transmitter circuit 18 and a receiver circuit 20. The diode module corresponds to, for example, the diode module 368 in FIGS. 8 and 9. The first to fourth optical fibers 4a-4d and the fifth to eighth optical fibers 4e-4h correspond to, for example, the first to fourth optical transmitter channels Tx0-Tx3 and the first to fourth optical receiver channels Rx0-Rx3 in FIGS. 8-11, respectively.

A distance between each of end surfaces of the optical fibers 4a-4d of the transmitter group and each corresponding one of the laser diodes 6a-6d of the transmitter group is at least about 10 μm and at most about 50 μm, preferably at least about 20 μm and at most about 30 μm. A distance between each of the laser diodes 6a-6d of the transmitter group and each corresponding one of the photodiodes 10a-10d of the monitor group is at least about 20 μm at most about 100 μm. A distance between each of end surfaces of the optical fibers 4e-4h of the receiver group and each corresponding one of the photodiodes 10e-10h of the receiver group is at least about 170 μm and at most about 500 μm.

According to this embodiment of the present invention, the eight optical fibers 4a-4h, the four laser diodes 6a-6d and the eight photodiodes 10a-10h have substantially equal pitches which are at least about 125 μm. In addition, a combined number of the optical fibers of the transmitter group and the receiver group of the fiber array 4 is eight, which is equal to a combined number of the photodiodes of the monitor group and the receiver group, and twice a number of the laser diodes of the transmitter group. Moreover, the eight optical fibers 4a-4h of the fiber array are equally divided to the transmitter group and the receiver group, and the eight photodiodes 10a-10h are equally divided to the transmitter group and the receiver group.

However, the pitches between the optical fibers 4a-4h, the laser diodes 6a-6d and the photodiodes 10a-10h may be arranged such that, for example, a pitch within one group of the fiber array 4 is different from a pitch within another group of the fiber array 4, or a pitch between the transmitter group and the receiver group of the fiber array 4 is different from a pitch within the transmitter group and the receiver group of the fiber array.

Further, the fiber array 4 may have any plural number of optical fibers and may be divided to more groups than the transmitter group and the receiver group. The photodiode array 10 may have any plural number of photodiodes and may be divided to more groups than the monitor group and the receiver group. The optical fibers and the photodiodes may be divided to plural groups unevenly, as long as each optical fiber of the transmitter group, each corresponding laser diode of the transmitter group and each corresponding photodiode of the monitor group can be optically aligned, respectively, and as long as each optical fiber of the receiver group can be optically aligned with each corresponding photodiode of the receiver group. A group or groups other than the transmitter group and the receiver group of the fiber array 4 may have one or more functions different from either or both the transmitter group and the receiver group of the fiber array 4, and a group or groups other than the monitor group and the receiver group of the photodiode array 10 may have one or more functions different from either or both the monitor group and the receiver group of the photodiode array 10.

Similarly, the laser diode array 6 may have one laser diode or any plural number of laser diodes. The laser diode array 6 may be divided to more groups than the transmitter group, and may be divided to plural groups unevenly, as long as each optical fiber of the transmitter group, each corresponding laser diode of the transmitter group and each corresponding photodiode of the monitor group can be optically aligned, respectively. A group or groups of the laser diode array 6 other than the transmitter group may have one or more functions different from the transmitter group of the laser diode array 6.

Moreover, according to this embodiment of the present invention, the transmitter group and the receiver group of the fiber array 4 are adjacent to each other, and the monitor group and the receiver group of the photodiode array 10 are adjacent to each other. In addition, the fiber array 4 and the photodiode array 10 each have a single tier including a first part and a second part. In the fiber array 4, the optical fibers 4a-4d of the transmitter group are in the first part, and the optical fibers 4e-4h of the receiver group are in the second part. In the photodiode array 10, the photodiodes 10a-10d of the monitor group are in the first part, and the photodiodes 10e-10h of the receiver group are in the second part.

However, one or more optical fibers or one or more different components of the multi form-factor pluggable transceiver may be provided between the transmitter group and the receiver group of the fiber array 4. Consequently, the photodiode array 10 may have one or more photodiodes or one or more different components of the multi form-factor pluggable transceiver between the monitor group and the receiver group. The monitor group and the receiver group of the photodiode array 10 may be simply spaced a part in order to be in optical alignment with the fiber array 4. Further, the first part of the fiber array 4 and the first part of the photodiode array 10 may be either side of the second part of the fiber array 4 and the second part of the photodiode array 10, as long as the transmitter group and the receiver group of the fiber array 4 are optically aligned with the monitor group and the receiver group of the photodiode array 10, respectively.

According to this embodiment of the present invention, the transmitter circuit 18 is connected to the laser diode 6a-6d of the transmitter group and to the photodiodes 10a-10d of the monitor group. The receiver circuit 20 is connected to the photodiodes 10e-110h of the receiver group. The transmitter circuit 18 controls the laser diodes 6a-6d to emit optical signals according to electrical signals to be transmitted being input to the transmitter circuit 18 via signal input lines 18a-18d. The photodiodes 10a-10d of the monitor group receive optical signals emitted from the laser diodes 6a-6d of the transmitter group, and output received optical signals to the transmitter circuit 18 to perform feed back control of the laser diodes 6a-6d. The photodiodes 10e-10h of the receiver group receive optical signals transmitted via the optical fibers 4e-4h of the receiver group, convert received optical signals to electrical signals, and output the electrical signals to the receiver circuit 20. The signal input lines 18a-18d of the transmitter circuit 18 and signal output lines 20a-20d of the receiver circuit 20 are connected to the mating portion 770.

According to this embodiment of the present invention, the pitches of the optical fibers 4a-4h of the fiber array 4, the laser diodes 6a-6d of the laser diode array 6 and the photodiodes 10a-10h of the photodiode array 10 are substantially equal. In addition, on a single substrate of the photodiode array 10, the photodiodes 10a-10d of the monitor group and the photodiodes 10e-10h of the receiver group can be positioned together, and perform functions of both independent monitoring of the optical output power of each of the laser diodes 6a-6d of the transmitter group, and receiving optical signals from the optical fibers 4e-4h of the receiver group.

As a result, for transmitting and receiving optical signals, the multi form-factor pluggable transceiver according to this embodiment of the present invention can increase, within limited space, a number of channels which are provided with optical output power monitors. Moreover, according to this embodiment of the present invention, structures of a multi form-factor pluggable transceiver can be simplified, and manufacturing cost of a multi form-factor pluggable transceiver can be reduced.

Figure 20:
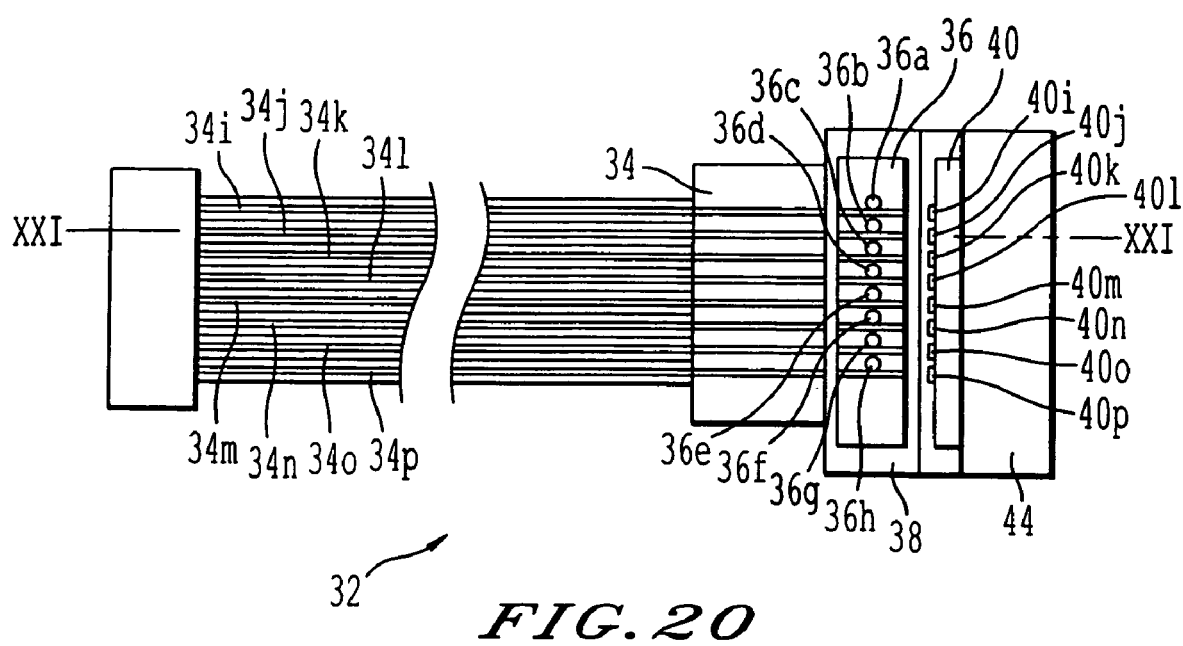
FIG. 20 is a partially exposed top plan view of a multi form-factor pluggable transceiver according to an embodiment of the present invention.
Figure 21:
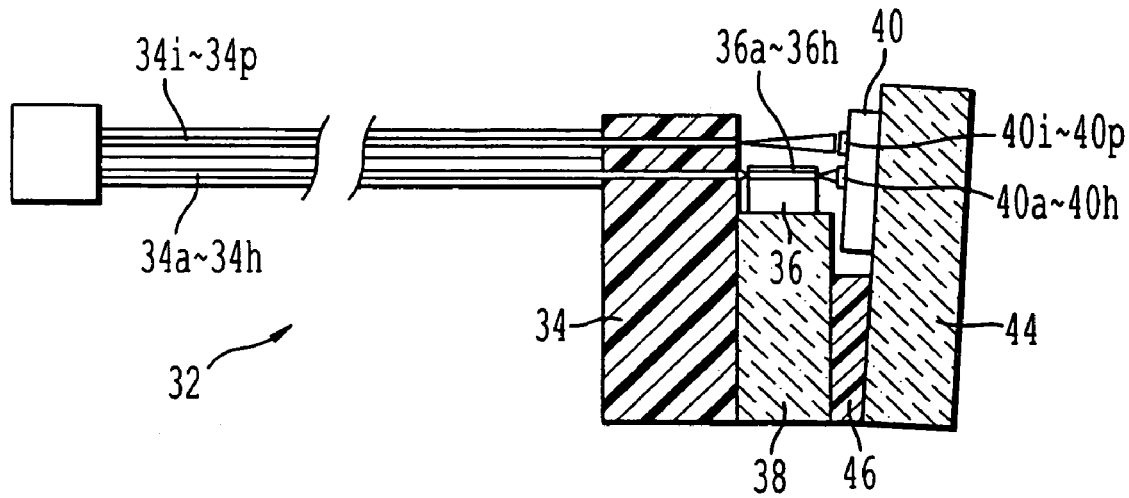
FIG. 21 is a cross sectional view of the multi form-factor pluggable transceiver cut along the line XXI-XXI of FIG. 20.
Figure 22:
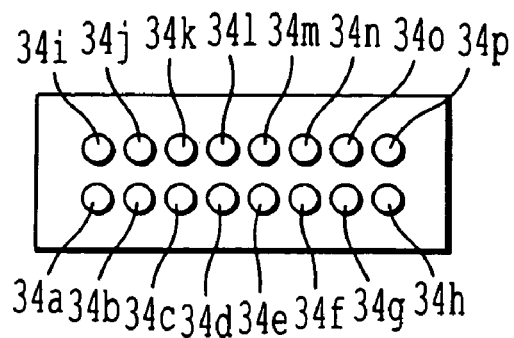
FIG. 22 is a front view of an optical fiber adapter of the multi form-factor pluggable transceiver in FIG. 20.

FIGS. 20-22 show a multi form-factor pluggable transceiver according to an embodiment of the present invention which includes a two tiered multi-channel fiber array and a two tiered multi-channel photodiode array. Referring to FIGS. 20-22, the multi form-factor pluggable transceiver 32 includes, a two tiered multi-channel, for example, 16-channel fiber array 34, a multi-channel, for example, 8-channel laser diode array 36, a laser diode submount 38, a two tiered multi-channel, for example, 16-channel photodiode array 40, and a photodiode submount 44.

The two tiered fiber array 34 is provided with a first tier and a second tier. First to eighth optical fibers 34a-34h in the first tier are in a transmitter group, and ninth to sixteenth optical fibers 34i-34p in the second tier are in a receiver group. The laser diode array 36 includes first to eighth laser diodes 36a-36h grouped as a transmitter group. The two tiered photodiode array 40 is provided with a first tier and a second tier. First to eighth photodiodes 40a-40h in the first tier are in a monitor group, and ninth to sixteenth photodiodes 40i-40p in the second tier are in a receiver group.

Pitches between each optical fiber of the first tier and each optical fiber of the second tier directly above the each optical fiber of the first tier, for example, between an optical fiber 34a and an optical fiber 34i, between each photodiode of the first tier and each photodiode of the second tier directly above the each photodiode of the first tier, between eight optical fibers of each of the transmitter group and the receiver group of the fiber array, between eight laser diodes of the transmitter group of the laser diode array, and between eight photodiodes of each of the monitor group and the receiver group of the photodiode array are substantially equal, and at least about 125 μm.

The fiber array 34, the laser diode array 36 and the photodiode array 40 are arranged such that the first to eighth optical fibers 34a-34h of the transmitter group, the first to eighth laser diodes 36a-36h of the transmitter group and the first to eighth photodiodes 40a-40h of the monitor group are optically aligned, respectively, and the ninth to sixteenth optical fibers 34i-34p of the receiver group and the ninth to sixteenth photodiodes 40i-40p of the receiver group are optically aligned, respectively. Each of the first to eighth photodiodes 40a-40h of the monitor group in the first tier receives optical output power of each of the first to eighth laser diodes 36a-36h of the transmitter group, respectively, and each of the ninth to sixteenth photodiodes 40i-40p of the receiver group in the second tier receives optical signals from each of the optical fibers 34i-34p of the receiver group, respectively.

According to this embodiment of the present invention, the first tier and the second tier of the fiber array are in a lower tier and an upper tier, respectively, and are adjacent to each other. The first tier and the second tier of the photodiode array are in a lower tier and an upper tier, respectively, and are adjacent to each other. However, the first tier may be upper in relation to the second tier in the fiber array and the photodiode array. In addition, one or more tiers of optical fibers or photodiodes, or one or more of other components of the multi form-factor pluggable transceiver may be provided between the first tier and the second tier in either or both the fiber array and the photodiode array. Further, the laser diode array may have one or more groups in one or more tiers other than a tier of the transmitter group, as long as each optical fiber of the transmitter group, each corresponding laser diode of the transmitter group and each corresponding photodiode of the monitor group can be optically aligned, respectively, and as long as each optical fiber of the receiver group can be optically aligned with each corresponding photodiode of the receiver group.

Moreover, the fiber array and the photodiode array may have any plural optical fibers and any plural photodiodes, respectively, and may be divided, evenly or unevenly, to plural groups in plural tiers. The laser diode array may have one or more laser diodes, and may be grouped, evenly or unevenly, in one or more groups in one or more tiers, as long as the optical fibers of the transmitter group, the laser diodes of the transmitter group, the photodiodes of the monitor group are optically aligned, respectively, and the optical fibers of the receiver group and the photodiodes of the receiver group are optically aligned, respectively.

According to this embodiment of the present invention, the fiber array and the photodiode array can be arranged such that the pitches between each optical fiber of the first tier and each optical fiber of the second tier directly above the each optical fiber of the first tier, between each photodiode of the first tier and each photodiode of the second tier directly above the each photodiode of the first tier, between the eight optical fibers of each of the transmitter group and the receiver group of the fiber array, between the eight laser diodes of the transmitter group of the laser diode array, and between the eight photodiodes of each of the monitor group and the receiver group of the photodiode array are substantially equal. In addition, on a single substrate of the photodiode array, the photodiodes of the monitor group and the receiver group can be positioned adjacent to each other, and perform functions of both independent monitoring of the optical output power of each of the laser diodes 36a-36h of the transmitter group, and receiving the optical signals from the optical fibers 34i-34p of the receiver group.

As a result, the multi form-factor pluggable transceiver according to this embodiment of the present invention can increase, within limited space, a number of channels which are provided with optical output power monitors. Moreover, according to this embodiment of the present invention, structures of a multi form-factor pluggable transceiver can be simplified, and manufacturing cost of a multi form-factor pluggable transceiver can be reduced.

Figure 23:
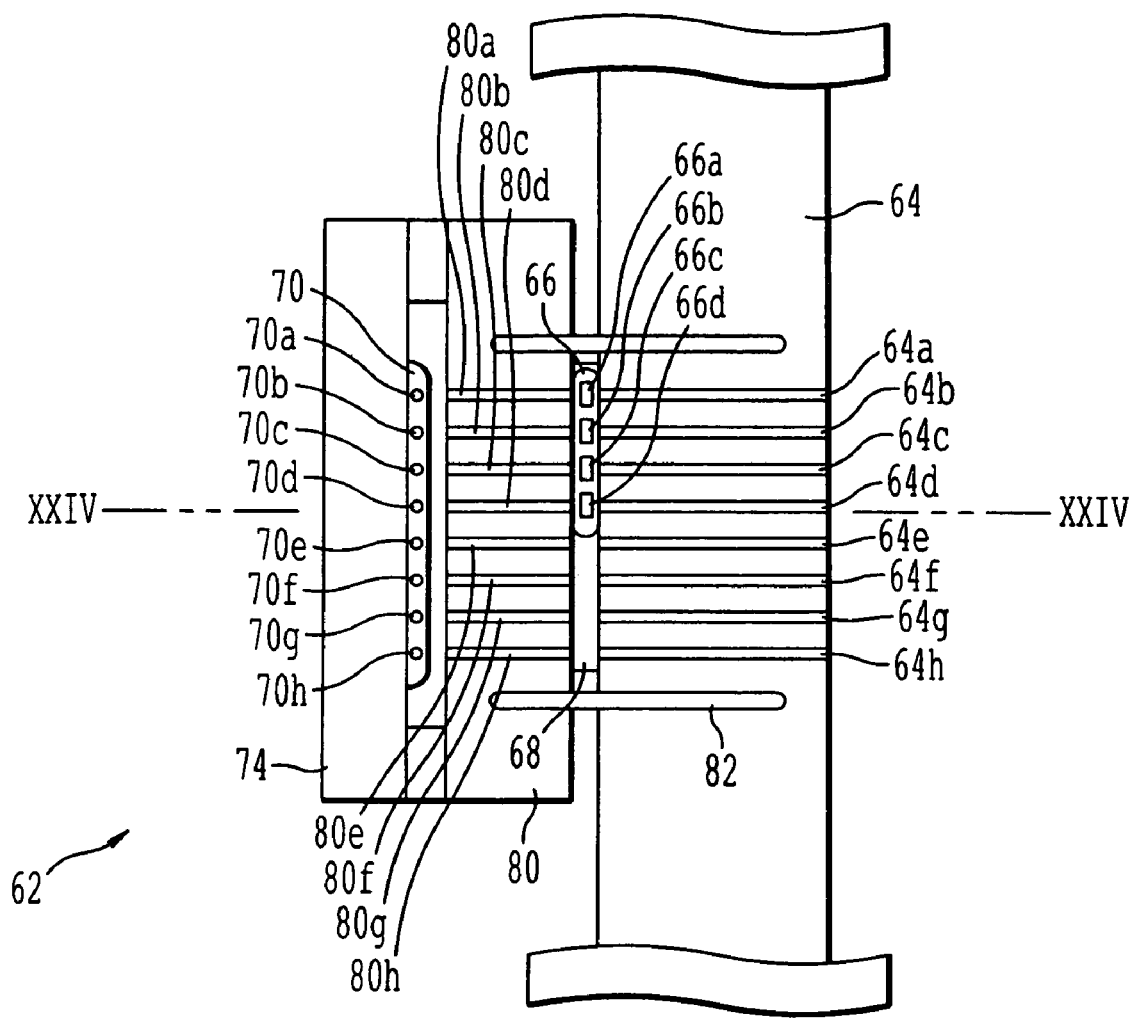
FIG. 23 is a partially exposed top plan view of a multi form-factor pluggable transceiver according to an embodiment of the present invention.
Figure 24:
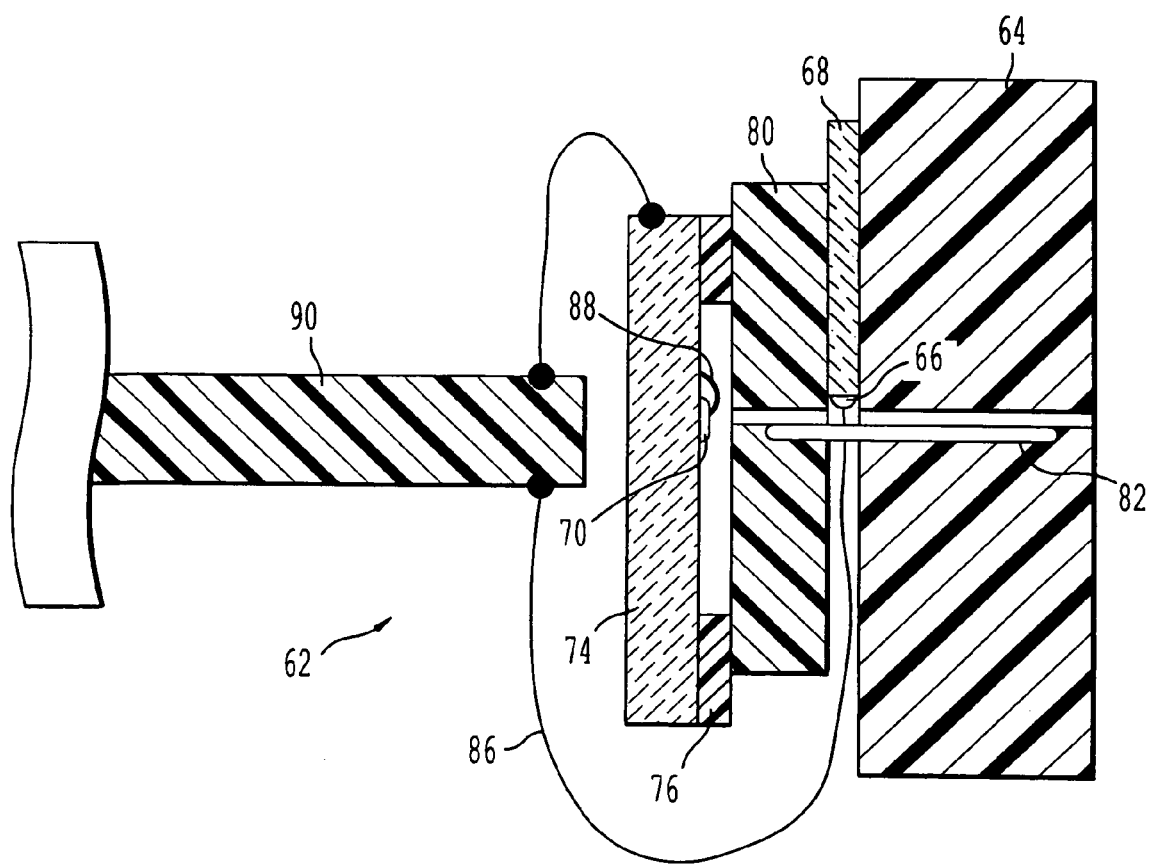
FIG. 24 is a cross sectional view of the multi form-factor pluggable transceiver cut along the line XXIV-XXIV of FIG. 23.

FIGS. 23 and 24 show a multi form-factor pluggable transceiver according to an embodiment of the present invention which includes a mechanical transfer ferrule. Referring to FIGS. 23 and 24, the multi form-factor pluggable transceiver 62 includes, a multi-channel, for example, 8-channel fiber array 64, a multi-channel, for example, 4-channel laser diode array 66, a laser diode submount 68, a multi-channel, for example, 8-channel photodiode array 70, a photodiode submount 74, and the mechanical transfer ferrule 80 with plural, for example, 8 optical fibers.

The fiber array 64 and the laser diode submount 68, and the laser diode submount 68 and the mechanical transfer ferrule 80 are bonded to each other to sandwich the laser diode array 66 by the fiber array 64 and the mechanical transfer ferrule 80. In addition, the fiber array 64 and the mechanical transfer ferrule 80 are connected by two guide pins 82 to sandwich the laser diode array 66 and the laser diode submount 68. A spacer 76 is provided between the mechanical transfer ferrule 80 and the photodiode submount 74 to provide space for the photodiode array 70 which is bonded on the photodiode submount 74. A photodiode lead wire 88 connects the photodiode array 70 to electrical circuits 90 to supply electrical currents and to receive electrical signals. A laser diode lead wire 86 connects the laser diode array 66 to the electrical circuits 90 to supply electrical currents and to receive electrical signals.

The fiber array 64 includes first to fourth optical fibers 64a-64d of a transmitter group, and fifth to eighth optical fibers 64e-64h of a receiver group. The laser diode array 66 includes first to fourth laser diodes 66a-66d of a transmitter group. The photodiode array 70 includes first to fourth photodiodes 70a-70d of a monitor group, and fifth to eighth photodiodes 70e-70h of a receiver group. The mechanical transfer ferrule 80 includes first to fourth optical fibers 80a-80d of a transmitter group and fifth to eighth optical fibers 80e-80h of a receiver group.

The fiber array 64, the laser diode array 66, the mechanical transfer ferrule 80, and the photodiode array 70 are arranged such that the first to fourth optical fibers 64a-64d of the transmitter group of the fiber array, the first to fourth laser diodes 66a-66d of the transmitter group, the first to fourth optical fibers 80a-80d of the transmitter group of the mechanical transfer ferrule, and the first to fourth photodiodes 70a-70d of the monitor group are optically aligned along an optical axis direction of transmitter groups, respectively, and such that the fifth to eighth optical fibers 64e-64h of the receiver group of the fiber array, the fifth to eighth optical fibers 80e-80h of the receiver group of the mechanical transfer ferrule, and the fifth to eighth photodiodes 70e-70h of the receiver group are optically aligned along an optical axis direction of receiver groups, respectively. A length of the mechanical transfer ferrule 80 along each of the optical axis direction of transmitter groups and the optical axis direction of receiver groups is, for example, at least about 1 mm.

Here, each pair of the transmitter group and the receiver group of the fiber array, the monitor group and the receiver group of the photodiode array, and the transmitter group and the receiver group of the mechanical transfer ferrule are adjacent to each other within a respective pair. However, one or more groups of optical fibers or one or more of other components of the multi form-factor pluggable transceiver may be provided between the transmitter group and the receiver group of the fiber array. Similarly, one or more groups of photodiodes or one or more of other components of the multi form-factor pluggable transceiver may be provided between the monitor group and the receiver group of the photodiode array, and one or more groups of optical fibers or one or more of other components of the multi form-factor pluggable transceiver may be provided between the transmitter group and the receiver group of the mechanical ferrule, as long as the optical fibers of the transmitter group of the fiber array, the laser diodes of the transmitter group, the optical fibers of the transmitter group of the mechanical ferrule and the photodiodes of the monitor group are optically aliened, respectively, and the optical fibers of the receiver group of the fiber array, the optical fibers of the receiver group of the mechanical ferrule and the photodiodes of the receiver group are optically aligned, respectively.

According to this embodiment of the present invention, because each of the optical fibers of the transmitter group 80a-80d and the receiver group 80e-80h of the mechanical transfer ferrule has a numerical aperture of at most about 0.21, the mechanical transfer ferrule 80 can reduce optical crosstalk between optical signals emitted from the laser diodes 66a-66d of the transmitter group to be received by the photodiodes 70a-70d of the monitor group, respectively. The mechanical transfer ferrule 80 can also reduce optical crosstalk between the laser diodes 66a-66d of the transmitter group and the optical fibers 64e-64h of the receiver group of the fiber array.

Moreover, because the mechanical transfer ferrule separates a point where the photodiode lead wire 88 is connected to the photodiode array from a point where the laser diode lead wire 86 is connected to the laser diode array, providing a distance of, for example, at least about 1 mm, electrical crosstalk between the photodiode lead wire 88 and the laser diode lead wire 86 can be reduced, thereby allowing the electrical circuits 90 to accurately receive electrical signals via the photodiode lead wire 88 and the laser diode lead wire 86.

Further, because the mechanical transfer ferrule 80 and the fiber array 64 are connected by the two guide pins 82, the mechanical transfer ferrule 80 can be precisely positioned in relation to the fiber array 64, and can also increase bonding strength between the laser diode submount 68 and the fiber array 64. Because of the two guide pins 82, the bonding strength between the laser diode submount 68 and the fiber array 64 can be increased to pass a temperature cycle test at −40° C., 85° C. and 500 cycles, and a high temperature and high humidity storage test at 85° C., 85% and 5,000 hours.

As a result, the multi form-factor pluggable transceiver according to this embodiment of the present invention can increase, within limited space, a number of channels which are provided with optical output power monitors, and can also stabilize transmission and reception of optical signals. In addition, because use of the two guide pins increases the bonding strength between the laser diode submount and the fiber array, the multi form-factor pluggable transceiver can be used even under an environment with either or both a high temperature and a high humidity. Moreover, structures of a multi form-factor pluggable transceiver can be simplified, and manufacturing cost of a multi form-factor pluggable transceiver can be reduced.

Figure 25:
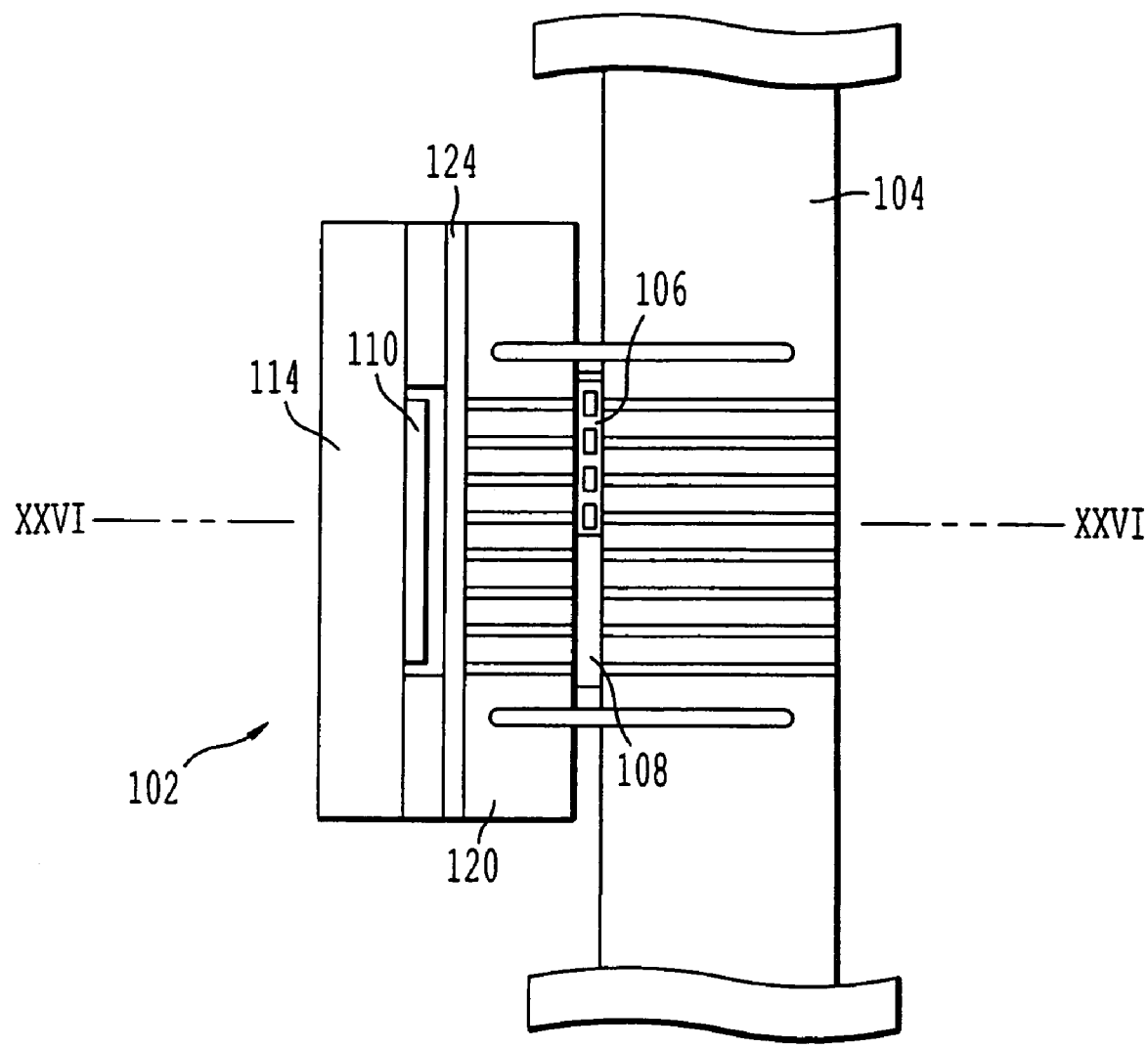
FIG. 25 is a partially exposed top plan view of a multi form-factor pluggable transceiver according to an embodiment of the present invention.
Figure 26:
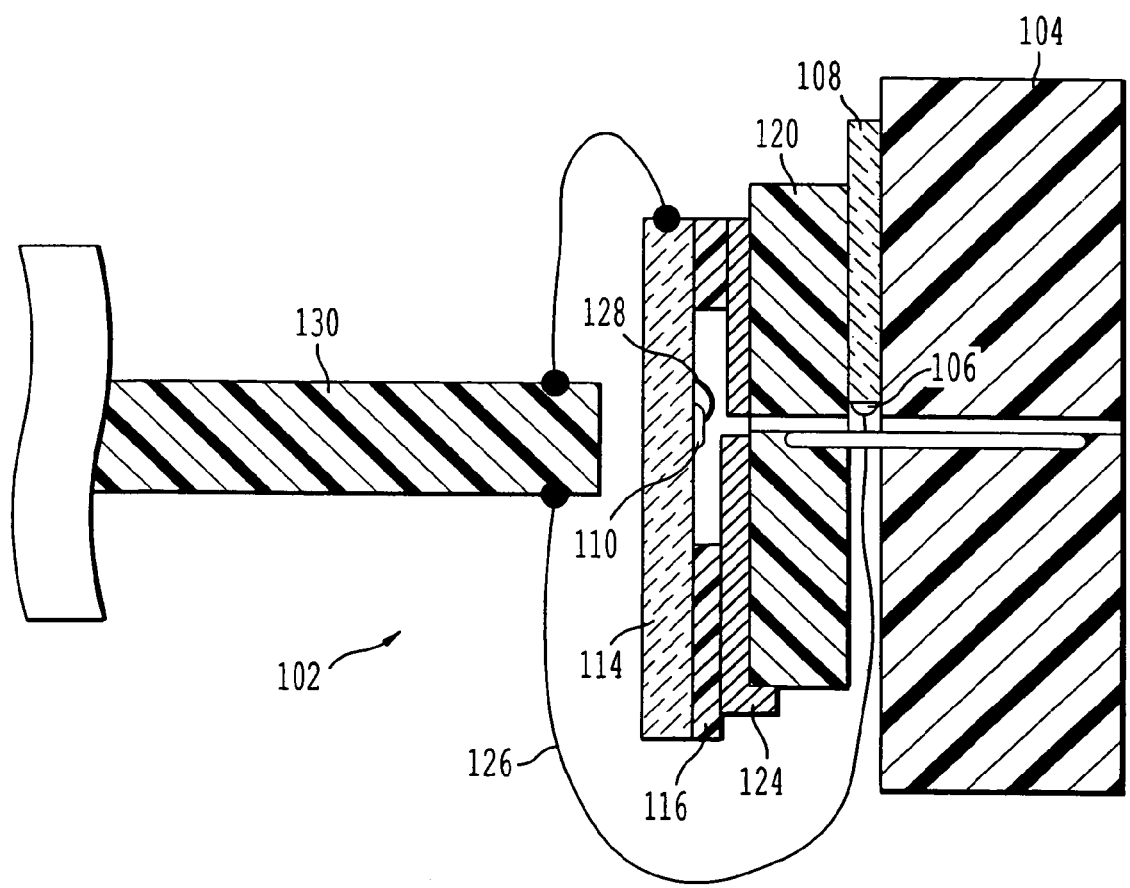
FIG. 26 is a cross sectional view of the multi form-factor pluggable transceiver cut along the line XXVI-XXVI of FIG. 25.

FIGS. 25 and 26 show a multi form-factor pluggable transceiver according to an embodiment of the present invention which includes a shield metal. Referring to FIGS. 25 and 26, the multi form-factor pluggable transceiver 102 includes, a multi-channel, for example, 8-channel fiber array 104, a multi-channel, for example, 4-channel laser diode array 106, a laser diode submount 108, a multi-channel, for example, 8-channel photodiode array 110, a photodiode submount 114, a mechanical transfer ferrule 120 with plural, for example, 8 optical fibers, and the shield metal 124.

The shield metal 124 is provided near a photodiode lead wire 128, bonded onto a surface of the mechanical transfer ferrule 120, and sandwiched by the photodiode array 110 and the mechanical transfer ferrule 120. The shield metal 124 may be between the laser diode array 106 and the mechanical transfer ferrule 120. A laser diode lead wire 126 connects the laser diode array 106 to electrical circuits 130. The photodiode lead wire 128 connects the photodiode array 110 to the electrical circuits 130.

According to this embodiment of the present invention, the shield metal 124 prevents electrical crosstalk between the photodiode lead wire 128 and the laser diode lead wire 126, which affects the photodiode lead wire 128, thereby increasing accuracy of electrical signals which the electrical circuits 130 receive from the photodiode array 110 via the photodiode lead wire 128. In addition, the mechanical transfer ferrule 120 coated by metal or made from metal coated plastics can also prevents the electrical crosstalk between the photodiode lead wire 128 and the laser diode lead wire 126, thereby increasing the accuracy of the electrical signals which the electrical circuits 130 receive from the photodiode array 110 via the photodiode lead wire 128.

As a result, the multi form-factor pluggable transceiver according to this embodiment of the present invention can increase, within limited space, a number of channels which are provided with optical output power monitors, and can also stabilize transmission and reception of optical signals. In addition, because use of at least one guide pin to connect the mechanical transfer ferrule and the fiber array increases bonding strength between the laser diode submount and the fiber array, the multi form-factor pluggable transceiver can be used even under an environment with either or both a high temperature and a high humidity. Moreover, according to this embodiment of the present invention, structures of a multi form-factor pluggable transceiver can be simplified, and manufacturing cost of a multi form-factor pluggable transceiver can be reduced.

Figure 27:
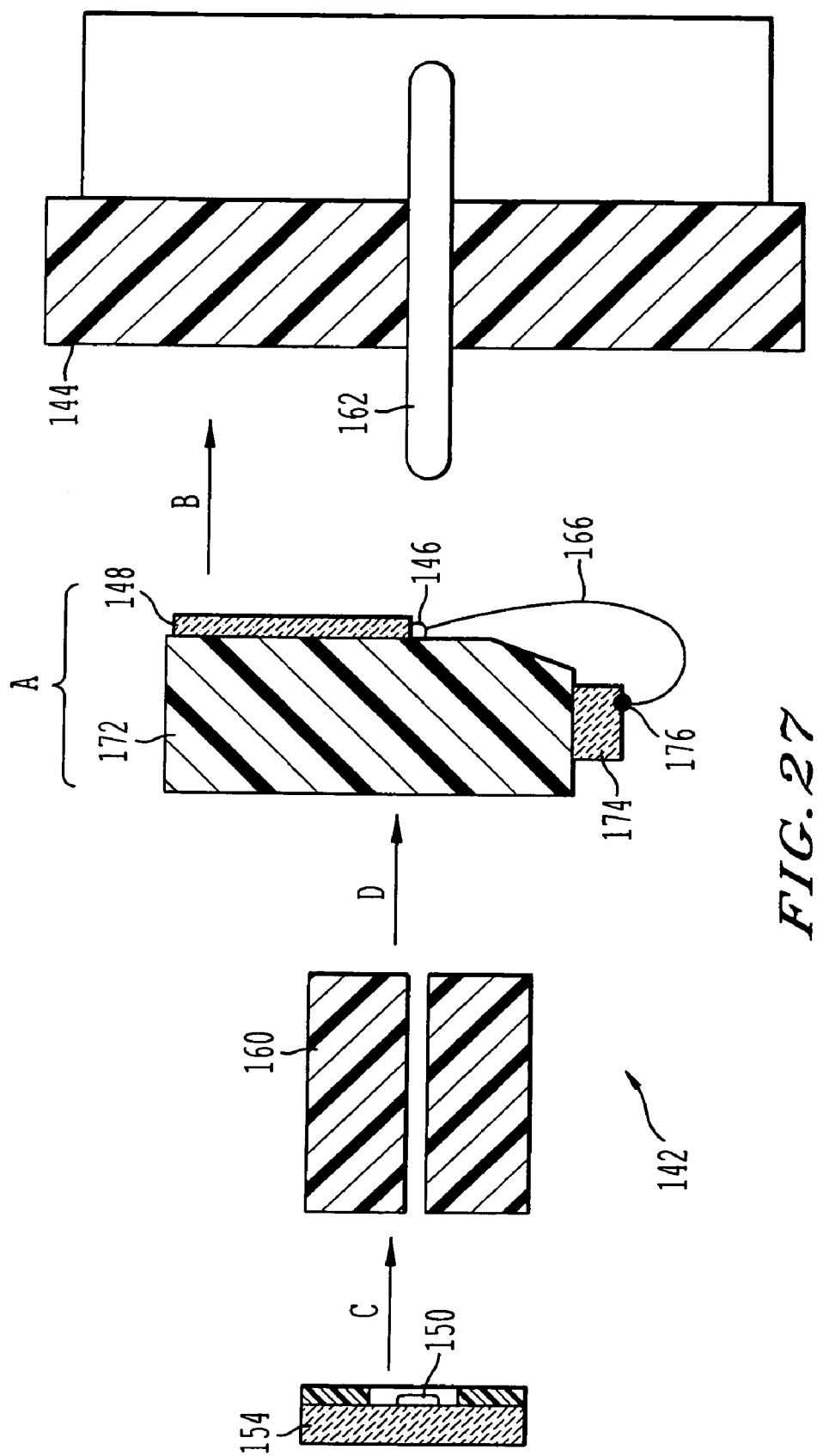
FIG. 27 is showing a method of manufacturing a multi form-factor pluggable transceiver according to the present invention.

FIG. 27 shows a method of manufacturing a multi form-factor pluggable transceiver according to an embodiment of the present invention which includes a bridge and a terminal block on the bridge. Referring to FIG. 27, the multi form-factor pluggable transceiver 142 includes, a multi-channel fiber array 144, a multi-channel laser diode array 146, a laser diode submount 148, a multi-channel photodiode array 150, a photodiode submount 154, a multi-channel mechanical transfer ferrule 160, the bridge 172 and the terminal block 174.

The bridge 172 connects with the laser diode submount 148. The laser diode submount 148 has a thickness of at least about 150 µm and at most about 350 µm. The bridge 172 is provided with an opening so that optical signals transmitted from laser diodes of a transmitter group of the laser diode array 146 and from optical fibers of a receiver group of the fiber array can pass through to be received by corresponding photodiodes of a monitor group and a receiver group of the photodiode array 150, without being attenuated. The terminal block 174, which is provided on the bridge 172, has a bonding pad 176 to bond one end of a laser diode lead wire 166 to the terminal block 174. The mechanical transfer ferrule 160 is connected with the bridge 172 and the photodiode array 150 to be sandwiched by the bridge 172 and the photodiode array 150. The fiber array 144, the laser diode array 146, the mechanical transfer ferrule 160 and the photodiode array 150 are optically aligned, respectively.

According to this embodiment of the present invention, because the laser diode submount 148 is provided with the bridge 172 and the terminal block 174, the laser diode lead wire 166 can be bonded to the laser diode array 146 without a need of a special tool, even when the laser diode submount 148 is with a thickness of, for example, about 150 µm. As a result, the multi form-factor pluggable transceiver according to this embodiment of the present invention can reduce manufacturing cost.

In the manufacturing of the multi form-factor pluggable transceiver according to the present invention, in a process A, the laser diode submount 148, on which the laser diode array 146 is provided, is positioned on the bridge 172, on which the terminal block 174 is provided. Then, one end of the laser diode lead wire 166 is bonded to the laser diode array 146 and another end of the laser diode lead wire 166 to the bonding pad 176 of the terminal block 174.

In a process B, each optical fiber of a transmitter group of the fiber array 144 is optically aligned with each corresponding laser diode of the transmitter group of the laser diode array 146. Then, the fiber array 144 is bonded to the laser diode submount 148 with the laser diode array 146, which is positioned on the bridge 172 during the process A.

In a process C, each optical fiber of a transmitter group and a receiver group of the mechanical transfer ferrule 160 is optically aligned with each corresponding photodiode of the monitor group and the receiver group of the photodiode array 150. Then, the mechanical transfer ferrule 160 is bonded to the photodiode submount 154 with the photodiode array 150.

In a process D, the mechanical transfer ferrule 160, onto which the photodiode submount 154 is bonded during the process C, is connected with the fiber array 144, onto which the laser diode submount 148 is bonded during the process B, using at least one guide pin 162, such that each optical fiber of the transmitter group of the fiber array, each laser diode of the transmitter group, each optical fiber of the transmitter group of the mechanical transfer ferrule and each photodiode of the monitor group are optically aligned, respectively, and such that each optical fiber of the receiver group of the fiber array, each optical fiber of the receiver group of the mechanical transfer ferrule and each photodiode of the receiver group are optically aligned, respectively.

According to this method of manufacturing a multi form-factor pluggable transceiver of the present invention, because the laser diode submount 148 is provided with the bridge 172 and the terminal block 174, the laser diode lead wire 166 can be bonded to the laser diode array 146 without a need of a special tool, even when the laser diode submount 148 is with a thickness of, for example, about 150 µm. As a result, the multi form-factor pluggable transceiver according to this embodiment of the present invention can reduce manufacturing cost.

Figure 28:
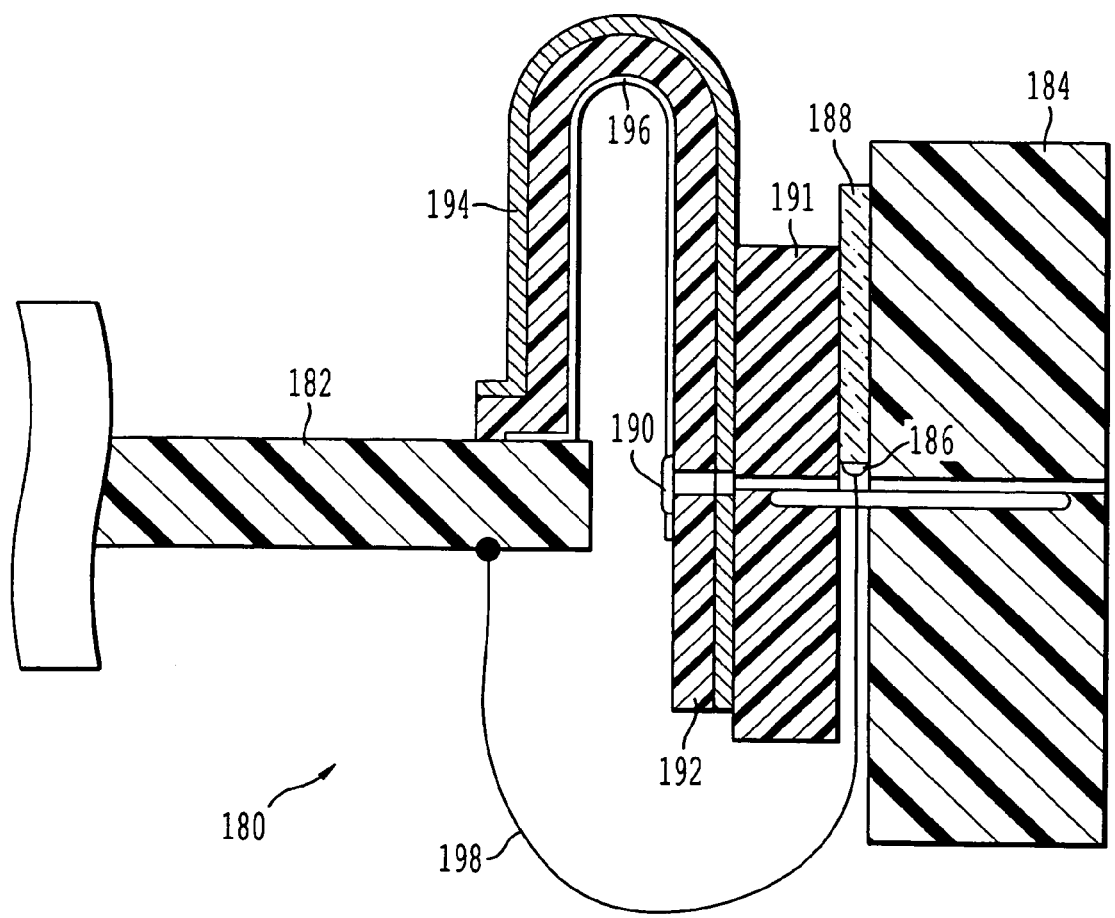
FIG. 28 is a side view of a multi form-factor pluggable transceiver according to an embodiment of the present invention.

FIG. 28 shows a multi form-factor pluggable transceiver according to an embodiment of the present invention which includes a flexible cable. Referring to FIG. 28, the multi form-factor pluggable transceiver 180 includes a multi-channel fiber array 184, a multi-channel laser diode array 186, a laser diode submount 188, a multi-channel photodiode array 190, a mechanical transfer ferrule 191, and the flexible cable 192.

The flexible cable 192, which replaces a photodiode submount, is provided with a shield metal layer 194 on one side, and a trace photodiode 196 on an opposite side to the side with the shield metal layer 194. The trace photodiode 196 has an opening through which optical signals, emitted by laser diodes of the laser diode array 186 and by optical fibers of the fiber array 184, can pass to be received by corresponding photodiodes of the photodiode array 190, without being attenuated. The shield metal layer 194 of the flexible cable is positioned so that electrical crosstalk between a laser diode lead wire 198 and the trace photodiode 196 is prevented.

According to this embodiment of the present invention, the flexible cable 192 includes functions of a photodiode submount, a spacer between the laser diode array 186 and the photodiode array 190 or between the photodiode array 190 and a shield metal, a shield metal between the laser diode array 186 and the photodiode array 190, and a photodiode lead wire which connects the photodiode array 190 to electrical circuits 182.

As a result, the multi form-factor pluggable transceiver according to this embodiment of the present invention can be manufactured with fewer parts, can increase within limited space a number of channels which are provided with optical output power monitors, and can also stabilize transmission and reception of optical signals. In addition, because use of at least one guide pin to connect the mechanical transfer ferrule and the fiber array increases bonding strength between the laser diode submount and the fiber array, the multi form-factor pluggable transceiver can be used even under an environment with either or both a high temperature and a high humidity. Moreover, according to this embodiment of the present invention, structures of a multi form-factor pluggable transceiver can be simplified, and manufacturing cost of a multi form-factor pluggable transceiver can be reduced.

Obviously, numerous modifications and variations of the present invention are possible in light of the above teachings. It is therefore to be understood that within the scope of the appended claims, the invention may be practiced otherwise than as specifically described herein.

What is claimed is:

1. An electrical connector comprising:

a connector body disposed on a printed circuit board surface of a printed circuit board;

at least one entry slot configured to accept a multi form-factor pluggable transceiver including first and second optical transmitter channels and first and second optical receiver channels;

said at least one entry slot comprising opposing sets of electrical pins in the connector body, the electrical pins extending longitudinally in a direction along the printed circuit board surface, the opposing sets of electrical pins including, first and second transmitter electrical pins provided with the at least one entry slot, the first transmitter electrical pins being configured to be electrically connected to first transmitter electrical pads of the first optical transmitter channel, the second transmitter electrical pins being configured to be electrically connected to second transmitter electrical pads of the second optical transmitter channel, and first and second receiver electrical pins provided with the at least one entry slot, the first receiver electrical pins being configured to be electrically connected to first receiver electrical pads of the first optical receiver channel, and the second receiver electrical pins being configured to be electrically connected to second receiver electrical pads of the second optical receiver channel, wherein the at least one entry slot comprises a single entry slot in said connector body which is provided with the first and second transmitter electrical pins and the first and second receiver electrical pins.

2. The electrical connector according to claim 1, wherein the single entry slot is further configured to accept a single form-factor pluggable transceiver having a single optical transmitter channel and a single optical receiver channel, the first transmitter electrical pins are configured to be electrically connected only to transmitter electrical pads of the single optical transmitter channel, and the first receiver electrical pins are configured to be electrically connected only to receiver electrical pads of the single optical receiver channel.

3. The electrical connector according to claim 1, wherein a combined number of the first transmitter electrical pins and the first receiver electrical pins of the single entry slot is at least twenty.

4. The electrical connector according to claim 2, wherein the first transmitter electrical pins and the first receiver electrical pins are in a first group of electrical pins, the second transmitter electrical pins and the second receiver electrical pins are in a second group of electrical pins, and the first group of electrical pins and the second group of electrical pins are alternately positioned in the single entry slot.

5. The electrical connector according to claim 4, wherein a separation distance between centers of the first group of electrical pins and the second group of electrical pins is substantially a half of a separation distance between the transmitter and receiver electrical pads of the single form-factor pluggable transceiver.

* * * * *

UNITED STATES PATENT AND TRADEMARK OFFICE
CERTIFICATE OF CORRECTION

PATENT NO. : 7,665,906 B2 Page 1 of 1
APPLICATION NO. : 11/501738
DATED : February 23, 2010
INVENTOR(S) : Takemasa Tamanuki et al.

It is certified that error appears in the above-identified patent and that said Letters Patent is hereby corrected as shown below:

Column 21, line 5, after the word "slot," insert --formed in the connector body and--.

Signed and Sealed this

Twenty-ninth Day of June, 2010

David J. Kappos
*Director of the United States Patent and Trademark Office*